(12) United States Patent
Kondo et al.

(10) Patent No.: US 7,952,769 B2
(45) Date of Patent: May 31, 2011

(54) SYSTEMS AND METHODS FOR IMAGE PROCESSING CODING/DECODING

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1515 days.

(21) Appl. No.: 11/348,458

(22) Filed: Feb. 7, 2006

(65) Prior Publication Data

US 2006/0188015 A1  Aug. 24, 2006

(30) Foreign Application Priority Data

Feb. 16, 2005  (JP) .................. P2005-039404

(51) Int. Cl.
 *H04N 1/00* (2006.01)
(52) U.S. Cl. .............. 358/426.12; 358/463; 358/426.02; 382/254; 382/245; 382/253; 348/251; 375/346; 375/240.24
(58) Field of Classification Search .................. 358/474, 358/463, 488, 463.1, 426.11, 426.12, 426.02, 358/426.03; 382/254, 173, 250, 233, 268, 382/245–253, 190, 224, 155, 238, 232, 248; 348/251, 248; 375/240.3, 240.24, 240.2, 375/346, 220, E7.205, E7.209, E7.211
See application file for complete search history.

(56) References Cited

U.S. PATENT DOCUMENTS

| | | | | |
|---|---|---|---|---|
| 5,369,502 A * | 11/1994 | Fukuda et al. | ............ | 358/426.12 |
| 5,684,922 A * | 11/1997 | Miyakawa et al. | ............ | 704/229 |
| 5,689,346 A * | 11/1997 | Noda et al. | ............... | 358/426.11 |
| 5,781,561 A * | 7/1998 | Machida et al. | ............... | 714/752 |
| 5,787,204 A * | 7/1998 | Fukuda | ........................ | 382/233 |
| 5,861,922 A * | 1/1999 | Murashita et al. | ........ | 375/240.24 |
| 6,205,254 B1 * | 3/2001 | Koshi et al. | .................... | 382/239 |
| 6,304,606 B1 * | 10/2001 | Murashita et al. | ........ | 375/240.24 |
| 6,317,522 B1 * | 11/2001 | Rackett | ......................... | 382/268 |
| 6,552,822 B1 * | 4/2003 | Kishimoto | ................... | 358/3.03 |
| 6,748,113 B1 * | 6/2004 | Kondo et al. | ................. | 382/232 |
| 6,809,669 B1 * | 10/2004 | Robinson | ...................... | 341/131 |
| 6,920,422 B2 * | 7/2005 | Kroon et al. | .................. | 704/222 |
| 7,127,119 B2 * | 10/2006 | Igarashi | ....................... | 382/250 |
| 7,289,671 B2 * | 10/2007 | Kondo et al. | ................. | 382/233 |
| 7,454,071 B2 * | 11/2008 | Howard | ........................ | 382/232 |
| 7,486,830 B2 * | 2/2009 | Kimura | ......................... | 382/233 |
| 7,609,897 B2 * | 10/2009 | Oneda et al. | .................. | 382/232 |
| 7,609,902 B2 * | 10/2009 | Verbeck et al. | ............... | 382/250 |
| 7,715,636 B2 * | 5/2010 | Kimura | ......................... | 382/232 |

(Continued)

FOREIGN PATENT DOCUMENTS

JP  04-139959  5/1992

(Continued)

*Primary Examiner* — Negussie Worku
(74) *Attorney, Agent, or Firm* — Finnegan, Henderson, Farabow, Garrett & Dunner, L.L.P.

(57) ABSTRACT

An image processing system includes a coding device configured to code input image data, and a decoding device configured to decode the coded input image data, wherein, if coding and decoding are repeated on the input image data, the image quality of an image corresponding to the input image data is deteriorated. The decoding device includes an input section inputting quantized data in which the input image data is quantized; and a decoding section dequantizing the quantized data that is input by the input section and converting a dequantized value obtained as a result of the quantization into a value in the vicinity of the boundary of a quantization threshold value within a range corresponding to the dequantized value when the quantization is performed.

16 Claims, 36 Drawing Sheets

U.S. PATENT DOCUMENTS

| | | | |
|---|---|---|---|
| 2002/0018598 A1* | 2/2002 | Maeda et al. | 382/239 |
| 2002/0085769 A1* | 7/2002 | Yokose et al. | 382/250 |
| 2002/0143556 A1* | 10/2002 | Kadatch | 704/500 |
| 2003/0007693 A1* | 1/2003 | Yokose et al. | 382/233 |
| 2003/0067976 A1* | 4/2003 | Igarashi | 375/240.2 |
| 2005/0254577 A1* | 11/2005 | Ando | 375/240.03 |
| 2006/0146929 A1* | 7/2006 | Tikhotski et al. | 375/240.03 |
| 2006/0182356 A1* | 8/2006 | Lillevold | 382/236 |
| 2006/0210182 A1* | 9/2006 | Kimura | 382/233 |
| 2006/0215918 A1* | 9/2006 | Kimura | 382/233 |
| 2006/0222078 A1* | 10/2006 | Raveendran | 375/240.16 |
| 2007/0036450 A1* | 2/2007 | Kondo et al. | 382/250 |
| 2007/0058873 A1* | 3/2007 | Kondo et al. | 382/233 |
| 2007/0297508 A1* | 12/2007 | Kobayashi | 375/240.05 |
| 2008/0095245 A1* | 4/2008 | Reznik | 375/240.25 |

FOREIGN PATENT DOCUMENTS

| | | |
|---|---|---|
| JP | 10-191391 | 7/1998 |
| JP | 1998-289522 | 10/1998 |
| JP | 2001-136526 | 5/2001 |
| JP | 2001-245270 | 9/2001 |
| JP | 2002-084413 | 3/2002 |
| JP | 2004-289685 | 10/2004 |

* cited by examiner

A          B

FIG. 15
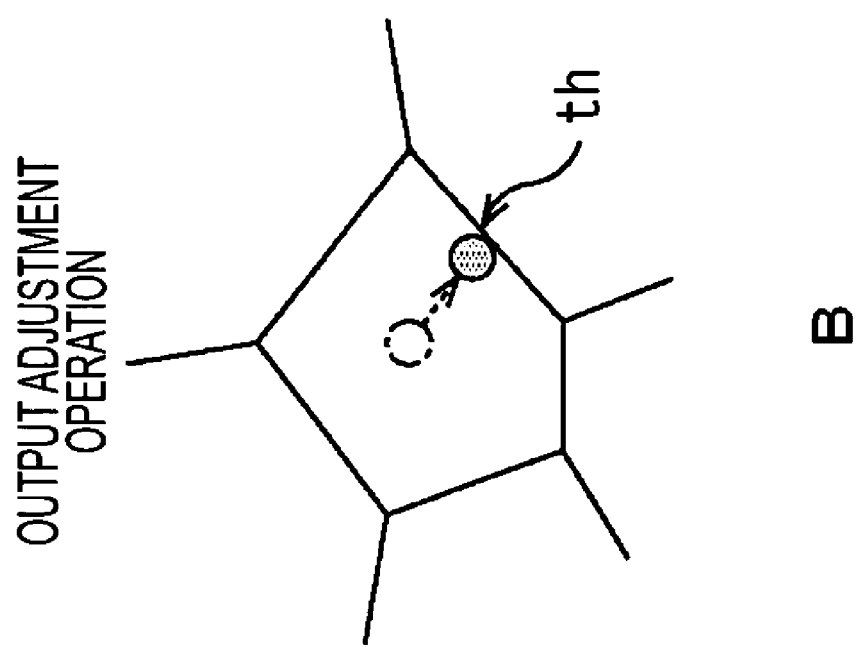
OUTPUT ADJUSTMENT OPERATION
th
B
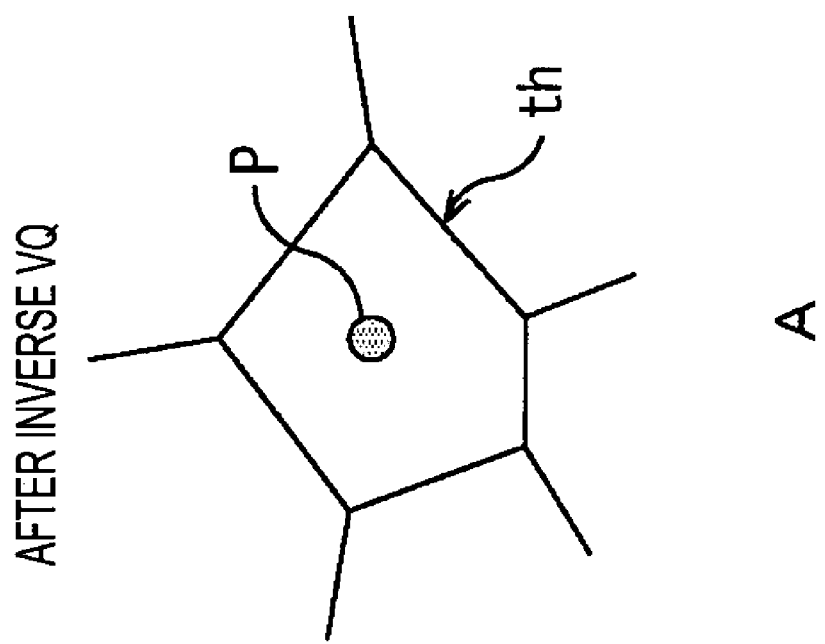
AFTER INVERSE VQ
P
th
A

SYSTEMS AND METHODS FOR IMAGE PROCESSING CODING/DECODING

CROSS REFERENCES TO RELATED APPLICATIONS

The present invention contains subject matter related to Japanese Patent Application JP 2005-039404 filed in the Japanese Patent office on Feb. 16, 2005, the entire contents of which are incorporated herein by reference.

BACKGROUND OF THE INVENTION

1. Field of the Invention

The present invention relates to a coding apparatus and method, a decoding apparatus and method, an image processing system, an image processing method, a recording medium, and a program. More particularly, the present invention relates to a coding apparatus and method for preventing illegal coping using an analog signal, a decoding apparatus and method for use therewith, an image processing system for use therewith, an image processing method for use therewith, a recording medium for use therewith, and a program for use therewith.

2. Description of the Related Art

In recent years, digital recording and reproduction apparatuses for recording content such as television programs using digital signals on a recording medium such as an HD (hard disk) or a DVD (Digital Versatile Disk) have rapidly become popular.

As a result of the popularization of digital recording and reproduction apparatuses in which an HD and/or a DVD is used as a recording medium, it has become possible for a user who is a viewer to easily record television programs on a recording medium with a high quality.

On the other hand, there is an aspect in which, as a result of the widespread use of digital recording and reproduction apparatuses, content, such as television programs and movies, which is sold in the form of DVDs, can easily be illegally copied.

FIG. 1 shows an example of the configuration of an image processing system for reproducing content recorded on a recording medium, for displaying the content, and for recording the played content into another recording medium.

In FIG. 1, an image processing system 1 includes a reproduction apparatus 11 for reproducing image signals of content recorded on a recording medium such as an optical disk such as a DVD and for outputting a resultant analog image signal Van; a display 12 for displaying, as an image, the analog image signal Van output by the reproduction apparatus 11; and a recording apparatus 13 for recording the analog image signal Van on a recording medium such as an optical disk.

The reproduction apparatus 11 includes a decoding section 21 and a D/A (Digital-to-Analog) conversion section 22. The decoding section 21 decodes a coded digital image signal read from a recording medium (not shown) and supplies the resultant digital image signal to the D/A conversion section 22. The D/A conversion section 22 converts the digital image signal supplied from the decoding section 21 into an analog signal and outputs the resultant analog image signal Van.

The display 12 is formed of, for example, a CRT (Cathode-Ray Tube), an LCD (Liquid Crystal Display), or the like, and displays, as an image, the analog image signal Van from the D/A conversion section 22. This makes it possible for the user to view an image corresponding to the image signal recorded on a recording medium.

Furthermore, the analog image signal Van output from the reproduction apparatus 11 is also supplied (input) to the recording apparatus 13.

The recording apparatus 13 includes an A/D (Analog-to-Digital) conversion section 31, a coding section 32, and a recording section 33, and records the input analog image signal Van on a recording medium (not shown) such as an optical disk.

The analog image signal Van output by the reproduction apparatus 11 is input to the A/D conversion section 31. The A/D conversion section 31 converts the input analog image signal Van into a digital signal and supplies the resultant digital image signal Vdg to the coding section 32. The coding section 32 codes the digital image signal Vdg from the A/D conversion section 31 and supplies the resultant coded digital image signal Vcd to the recording section 33. The recording section 33 records the coded digital image signal Vcd on a recording medium.

In the image processing system 1 configured as described above, by using the analog image signal Van output from the reproduction apparatus 11, an image signal can be recorded on a recording medium differing from the recording medium from which a playback is performed. That is, there is a risk in that, by using the analog image signal Van output by the reproduction apparatus 11, (the image signal of) content is illegally copied.

Hitherto, in order to prevent illegal copying using such an analog image signal Van, when copyright protection is made, it is proposed that the analog image signal Van be subjected to a scrambling process and be output, or the output of the analog image signal Van be prohibited (refer to, for example, Japanese Unexamined Patent Application Publication No. 2001-245270).

Furthermore, a digital video apparatus is proposed in which a noise information generation section is provided in one of a compression decoding section on the playback side and a compression coding section on the recording side or both, and noise information to such a degree that it may not be identified during image playback in one process is embedded into digital video data, so that copying itself is possible, but if copying is repeated for a plurality of times, the image is deteriorated considerably, thereby substantially limiting the number of times of copying (refer to, for example, Japanese Unexamined Patent Application Publication No. 1998-289522).

However, in the method of subjecting the analog image signal Van into a scrambling process and outputting the signal or of prohibiting the output of the analog image signal Van as in Japanese Unexamined Patent Application Publication No. 2001-245270, a problem arises in that, although illegal copying can be prevented, a normal image may not be displayed on the display 12.

In the method of embedding noise information in the compression decoding section on the playback side or in the compression coding section on the recording side as in Japanese Unexamined Patent Application Publication No. 1998-289522, a noise information generation section and a circuit for embedding the noise information become necessary, presenting the problem that the circuit size increases.

Accordingly, a technique for preventing illegal copying using an analog image signal without causing problems, such as an image being not displayed or the circuit size becoming large, to occur, is proposed by the applicant of the present invention (refer to, for example, Japanese Unexamined Patent Application Publication No. 2004-289685).

SUMMARY OF THE INVENTION

In the technique disclosed in Japanese Unexamined Patent Application Publication No. 2004-289685, note is taken of analog noise, such as phase variation of a digital image signal obtained by performing A/D conversion on an analog image signal. By performing coding using phase variation on the digital image signal, copying with the satisfactory quality being maintained without decreasing the quality of the image before copying may be made impossible, thereby preventing illegal copying using an analog image signal. In recent years when distribution of digital content has been common, there has been a demand for the proposition of another technique for preventing illegal copying in the manner described above.

The present invention has been made in view of such circumstances. It is desirable to be capable of preventing illegal copying using an analog signal.

According to an embodiment of the present invention, there is provided a decoding apparatus including: an input section inputting quantized data in which input image data is quantized; and a decoding section dequantizing the quantized data that is input by the input section and converting a dequantized value obtained as a result of the quantization into a value in the vicinity of the boundary of a quantization threshold value within a range corresponding to the dequantized value when the quantization is performed.

The input section may input the quantized data of a block quantized in a quantization step determined on the basis of a dynamic range of image data, and the decoding section may dequantize the quantized data input by the input section and may convert the resultant value of a pixel that forms the block into a value in the vicinity of the boundary of a quantization threshold value within a range corresponding to the pixel value when the quantization is performed.

The input section may input quantized data obtained as a result of being vector quantized, and the decoding section may perform inverse vector quantization on the quantized data input by the input section and may convert the resultant representative value into a value in the vicinity of the boundary of a quantization threshold value within a range corresponding to the representative value when the quantization is performed.

The input section may input quantized data of DCT coefficients, and the decoding section may dequantize the quantized data input by the input section and may convert a predetermined DCT coefficient of the resultant DCT coefficients into a value in the vicinity of the boundary of a quantization threshold value within a range corresponding to the DCT coefficient when the quantization is performed.

The decoding apparatus may further include a noise addition section adding noise to the output of the decoding section.

According to another embodiment of the present invention, there is provided a decoding method including the steps of: inputting quantized data in which input image data is quantized; and decoding by dequantizing the quantized data that is input by the input step and by converting a dequantized value obtained as a result of the quantization into a value in the vicinity of the boundary of a quantization threshold value within a range corresponding to the dequantized value when the quantization is performed.

According to another embodiment of the present invention, there is provided a recording medium having recorded thereon a program, the program including the steps of: inputting quantized data in which input image data is quantized; and decoding by dequantizing the quantized data that is input by the input step and by converting a dequantized value obtained as a result of the quantization into a value in the vicinity of the boundary of a quantization threshold value within a range corresponding to the dequantized value when the quantization is performed.

In the decoding apparatus and method and the program recorded on the recording medium according to the embodiments of the present invention, quantized data in which input image data is quantized is input, the input quantized data is dequantized, and the dequantized value obtained as a result of the quantization is converted into a value in the vicinity of the boundary of a quantization threshold value in a range corresponding to the dequantized value when the quantization is performed.

According to another embodiment of the present invention, there is provided an image processing system including: a coding device configured to code input image data, and a decoding device configured to decode the coded input image data, wherein, if coding and decoding are repeated on the input image data, the image quality of an image corresponding to the input image data is deteriorated, and the coding device quantizes the input image data.

According to another embodiment of the present invention, there is provided an image processing method for use with an image processing system including a coding device configured to code input image data, and a decoding device configured to decode the coded input image data, wherein, if coding and decoding are repeated on the input image data, the image quality of an image corresponding to the input image data is deteriorated, the image processing method including the step of: quantizing the input image data.

In the image processing system including: a coding device configured to code input image data, and a decoding device configured to decode the coded input image data, wherein, if coding and decoding are repeated on the input image data, the image quality of an image is deteriorated, and in the image processing method, the input image data is quantized in coding.

According to another embodiment of the present invention, there is provided an image processing system including: a coding device configured to code input image data, and a decoding device configured to decode the coded input image data, wherein, if coding and decoding are repeated on the input image data, the image quality of an image corresponding to the input image data is deteriorated, and the decoding device includes an input section inputting quantized data in which the input image data is quantized; and a decoding section dequantizing the quantized data that is input by the input section and converting a dequantized value obtained as a result of the quantization into a value in the vicinity of the boundary of a quantization threshold value within a range corresponding to the dequantized value when the quantization is performed.

According to another embodiment of the present invention, there is provided an image processing method for use with an image processing system including a coding device configured to code input image data, and a decoding device configured to decode the coded input image data, wherein, if coding and decoding are repeated on the input image data, the image quality of an image corresponding to the input image data is deteriorated, the image processing method including the steps of: inputting quantized data in which input image data is quantized; and decoding by dequantizing the quantized data that is input by the input step and by converting a dequantized value obtained as a result of the quantization into a value in the vicinity of the boundary of a quantization threshold value within a range corresponding to the dequantized value when the quantization is performed.

In the image processing system including: a coding device configured to code input image data, and a decoding device configured to decode the coded input image data, wherein, if coding and decoding are repeated on the input image data, the image quality of an image is deteriorated in the image processing method, in decoding, quantized data in which input image data is quantized is input and the input quantized data is dequantized, and a dequantized value obtained as a result of the quantization is converted into a value in the vicinity of the boundary of a quantization threshold value within a range corresponding to the dequantized value when the quantization is performed.

BRIEF DESCRIPTION OF THE DRAWINGS

FIG. 15 illustrates a process of an output adjustment circuit 263 of FIG. 14;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 7:
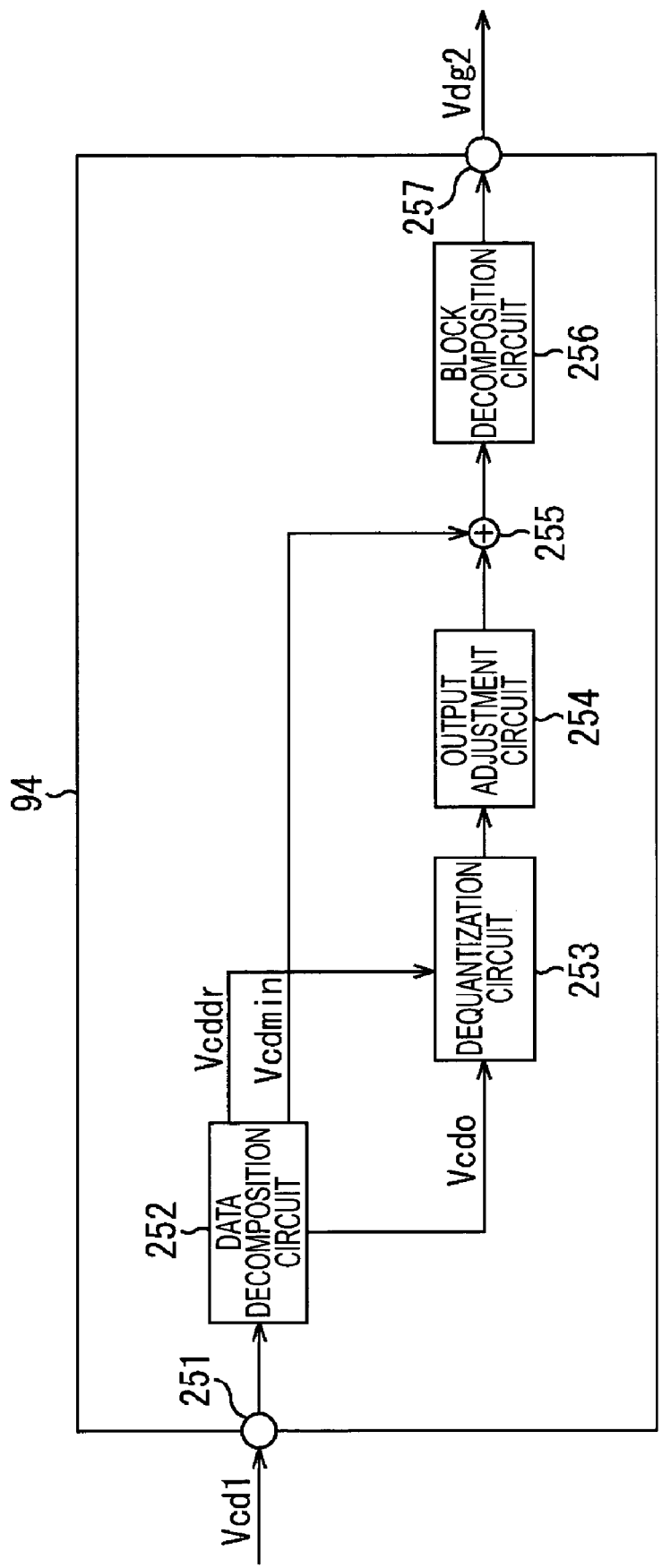
FIG. 7 is a block diagram showing an example of the configuration of a decoding section 94 of FIG. 2 according to the first embodiment of the present invention.

A decoding apparatus according to an embodiment of the present invention includes: an input section (for example, a data decomposition circuit 252 of FIG. 7) inputting quantized data in which input image data is quantized; and a decoding section (for example, a dequantization circuit 253 and an output adjustment circuit 254 of FIG. 7) dequantizing the quantized data that is input by the input section and converting a dequantized value obtained as a result of the quantization into a value in the vicinity of the boundary of a quantization threshold value within a range corresponding to the dequantized value when the quantization is performed.

Figure 25:
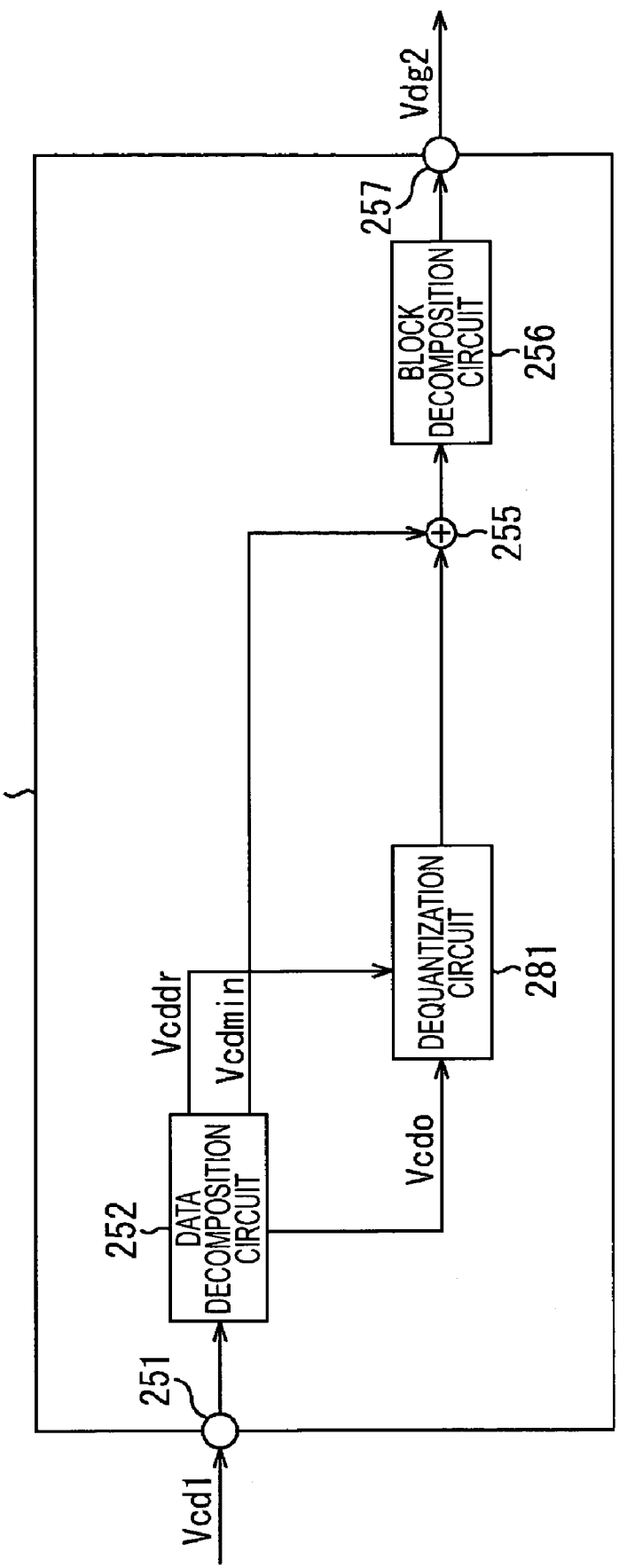
FIG. 25 is a block diagram showing another example of the configuration of the decoding section 94 of FIG. 2 according to the first embodiment of the present invention.

In the decoding apparatus, the input section (for example, the data decomposition circuit 252 of FIG. 7 or FIG. 25) inputs the quantized data of a block quantized in a quantization step determined on the basis of a dynamic range of image data, and the decoding section (for example, a dequantization circuit 253 and an output adjustment circuit 254 of FIG. 7, or a dequantization circuit 281 of FIG. 25) dequantizes the quantized data input by the input section and converts the resultant value of a pixel that forms the block into a value in the vicinity of the boundary of a quantization threshold value within a range corresponding to the pixel value when the quantization is performed.

Figure 14:
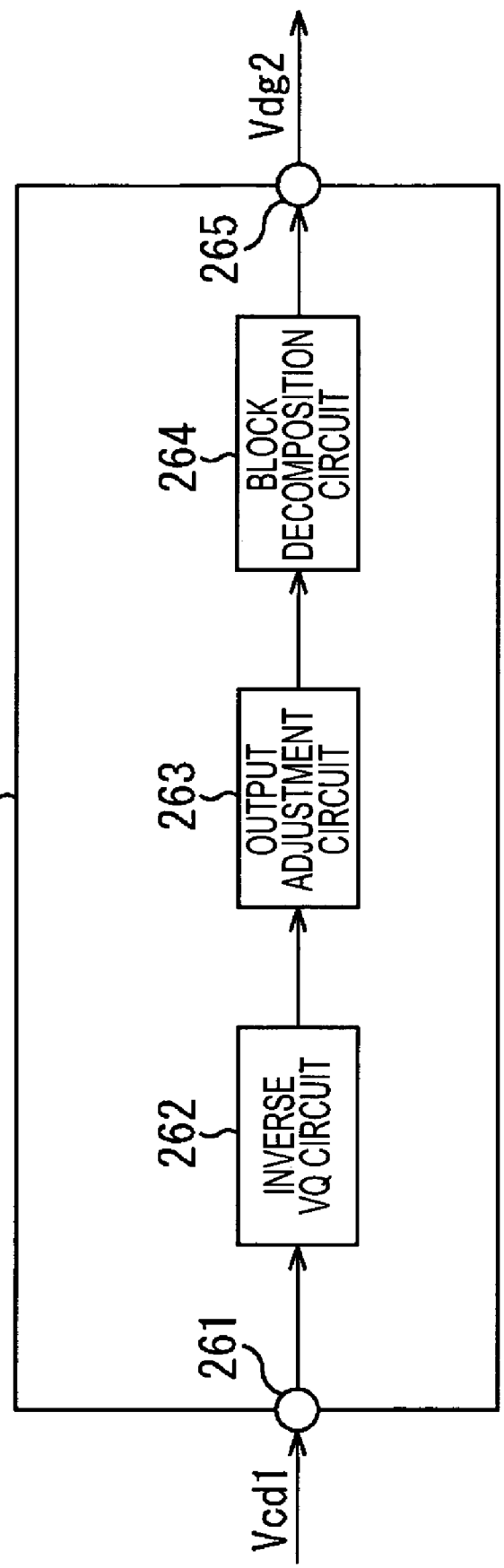
FIG. 14 is a block diagram showing an example of the configuration of the decoding section 94 of FIG. 2 according to the second embodiment of the present invention.
Figure 28:
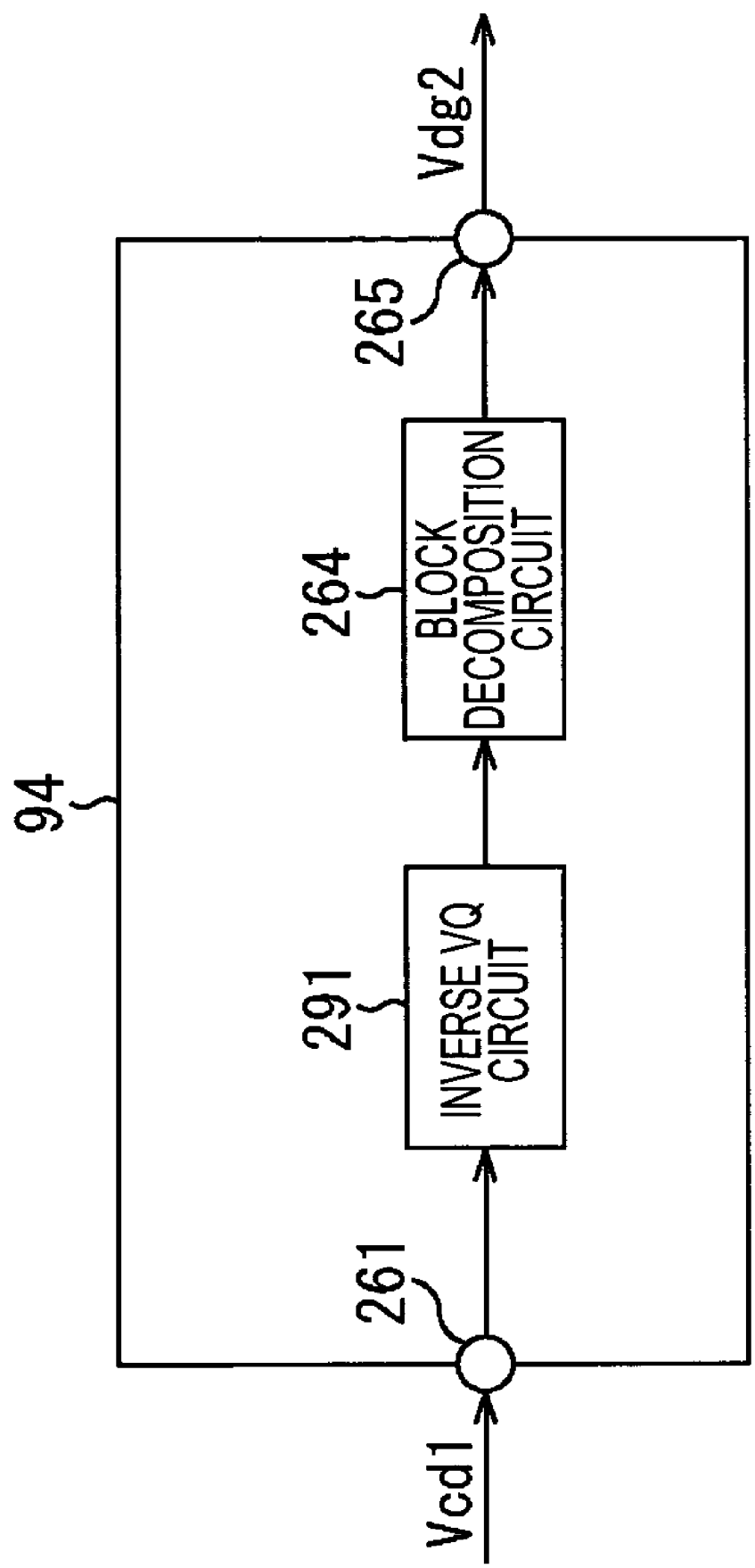
FIG. 28 is a block diagram showing another example of the configuration of the decoding section 94 of FIG. 2 according to the second embodiment of the present invention.
Figure 29:
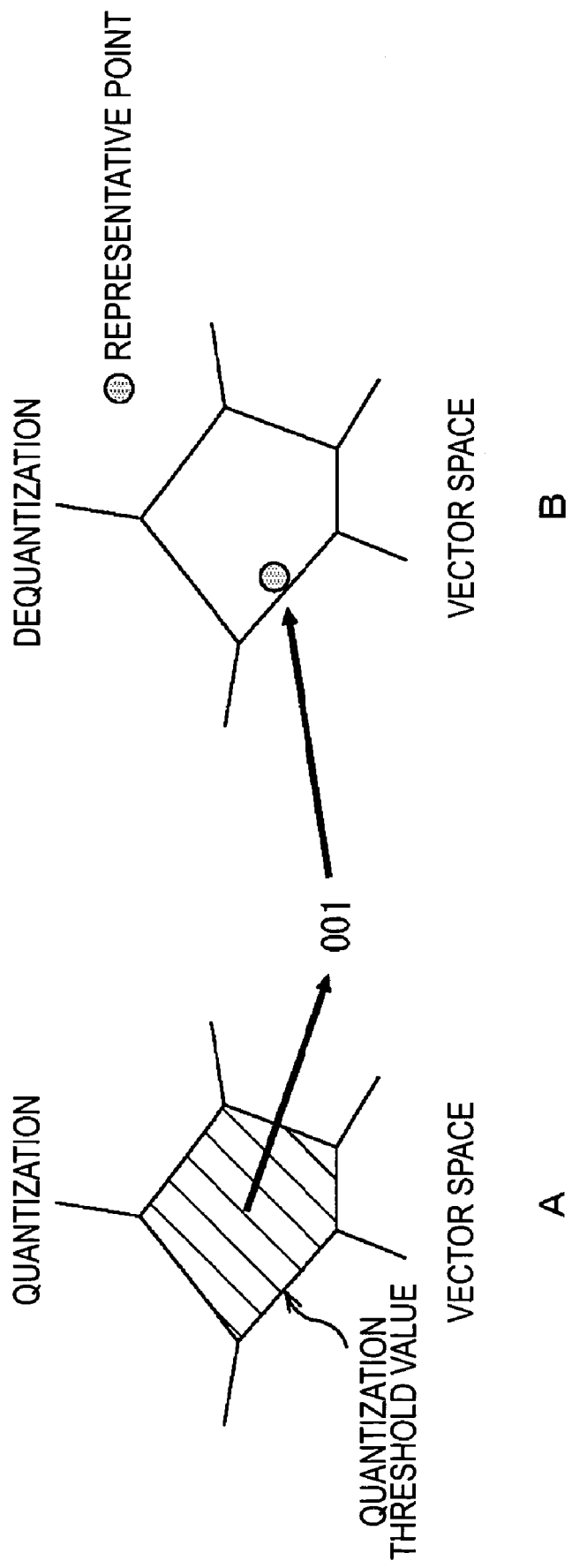
FIG. 29 illustrates a process of an inverse vector quantization circuit 291 of FIG. 28.

In the decoding apparatus, the input section (for example, an inverse VQ circuit 262 of FIG. 14 or an inverse VQ circuit 291 of FIG. 28) inputs quantized data obtained as a result of being vector quantized, and the decoding section (for example, an inverse VQ circuit 262 and an output adjustment circuit 263 of FIG. 14, or an inverse VQ circuit 291 of FIG. 29) performs inverse vector quantization on the quantized data input by the input section and converts the resultant representative value into a value in the vicinity of the boundary of a quantization threshold value within a range corresponding to the representative value when the quantization is performed.

Figure 21:
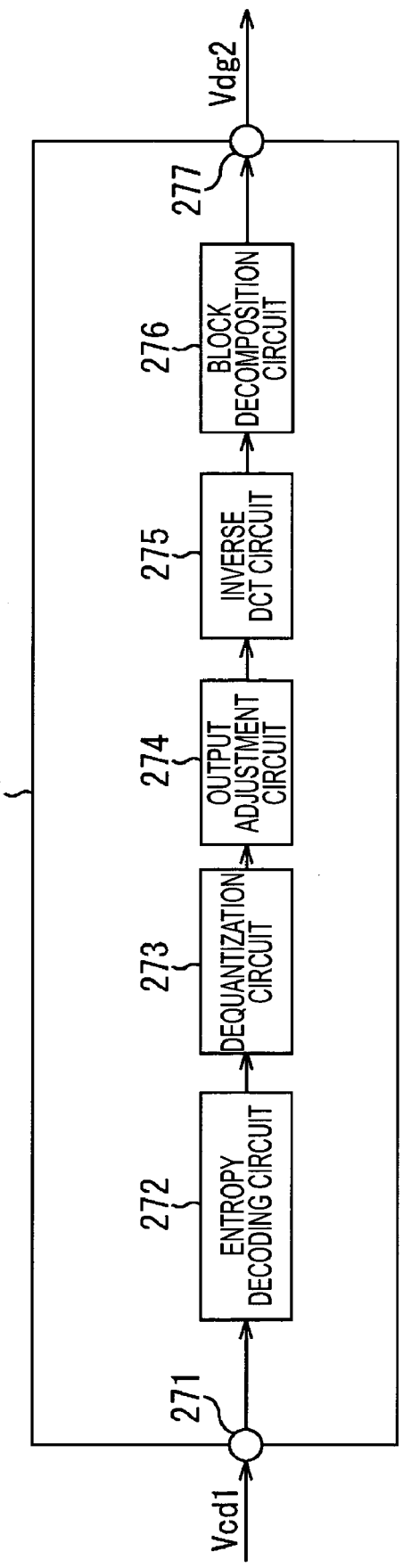
FIG. 21 is a block diagram showing an example of the configuration of the decoding section 94 of FIG. 2 according to the third embodiment of the present invention.
Figure 31:
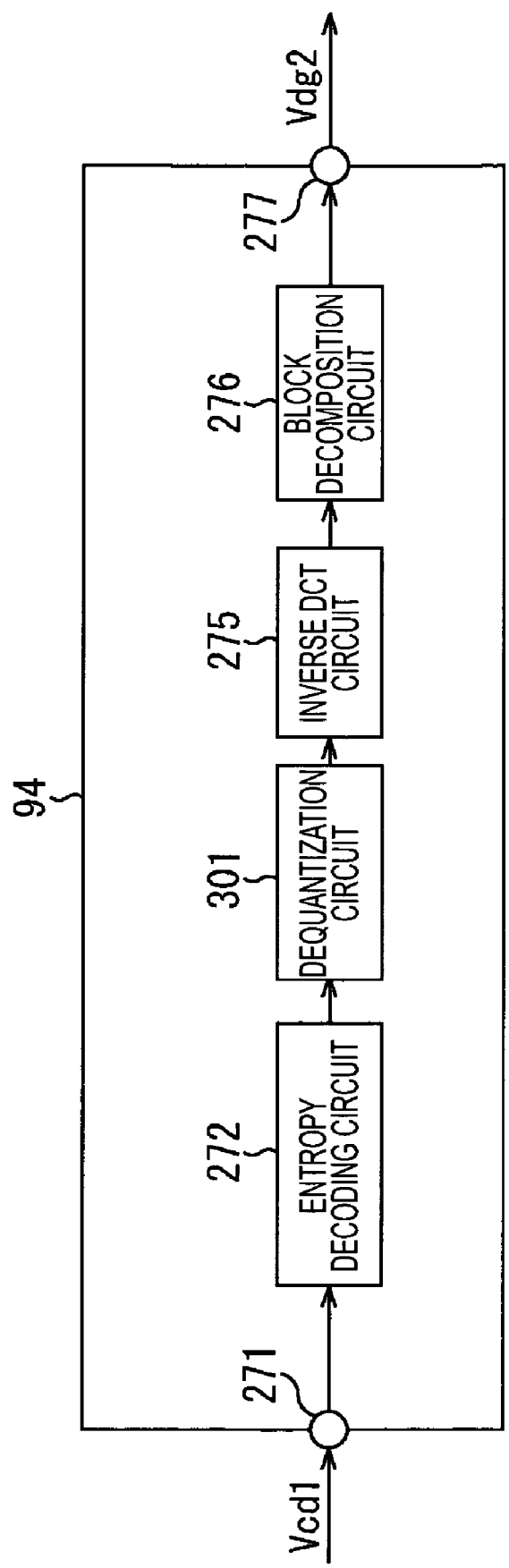
FIG. 31 is a block diagram showing another example of the configuration of the decoding section 94 of FIG. 2 according to the third embodiment of the present invention.

In the decoding apparatus, the input section (for example, an entropy decoding circuit 272 of FIG. 21 or FIG. 31) inputs quantized data of DCT coefficients, and the decoding section (for example, a dequantization circuit and an output adjustment circuit 274 of FIG. 21, or a dequantization circuit 301 of FIG. 31) dequantizes the quantized data input by the input section and converts a predetermined DCT coefficient of the resultant DCT coefficients into a value in the vicinity of the boundary of a quantization threshold value within a range corresponding to the DCT coefficient when the quantization is performed.

The decoding apparatus according to an embodiment of the present invention further includes a noise addition section (for example, noise addition circuits 352 and 353 of FIG. 35) adding noise to the output of the decoding section.

The decoding method according to an embodiment of the present invention includes the steps of: inputting (for example, step S21 of FIG. 10) quantized data in which input image data is quantized; and decoding (for example, steps S22 and 23 of FIG. 10) by dequantizing the quantized data that is input by the input step and by converting a dequantized value obtained as a result of the quantization into a value in the vicinity of the boundary of a quantization threshold value within a range corresponding to the dequantized value when the quantization is performed.

Specific examples of each step of the program of the recording medium as set forth in the embodiment and of the program as set forth in the embodiment are identical to specific examples of each step of the decoding method as set forth in the embodiment of the invention.

Embodiments of the present invention will now be described below with reference to the drawings.

Figure 1:
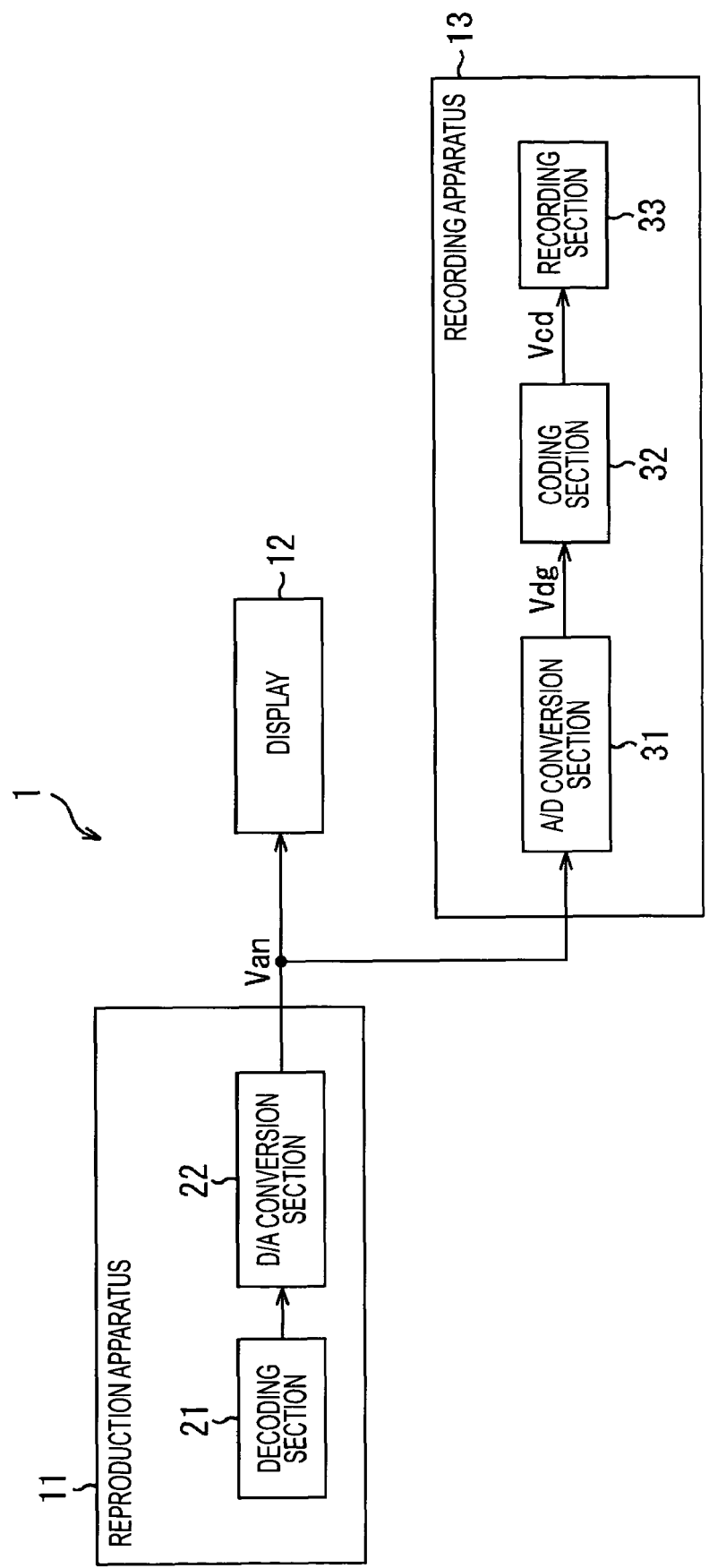
FIG. 1 is a block diagram showing an example of the configuration of an image processing system of the related art.
Figure 2:
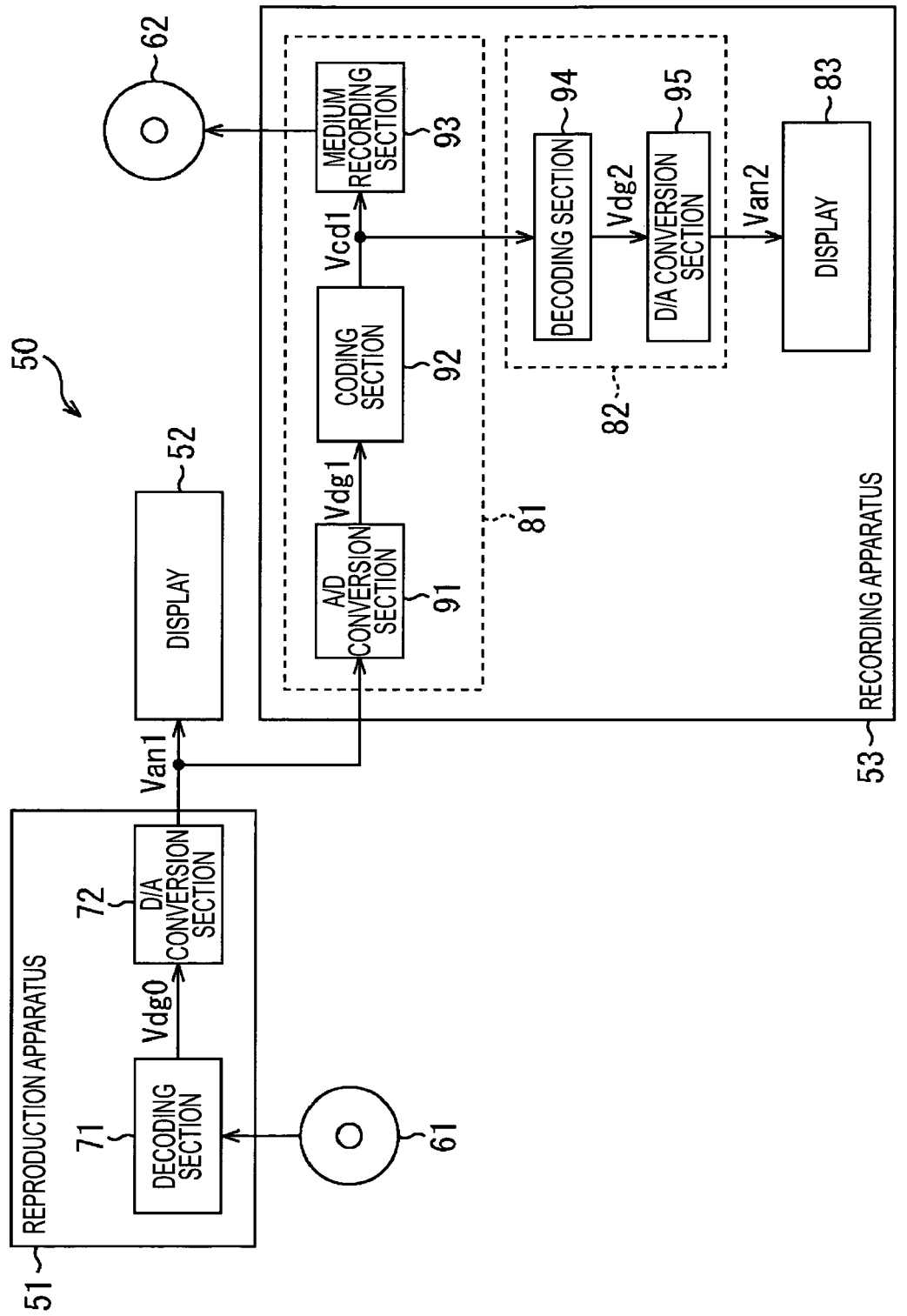
FIG. 2 is a block diagram showing an example of the configuration of an image processing system to which an embodiment of the present invention is applied.

FIG. 2 shows an example of the configuration of an image processing system 50 to which an embodiment of the present invention is applied.

The reproduction apparatus 51 reproduces image (original content) recorded on a recording medium 61 such as an optical disk, for example, a DVD, or an image (copied content) recorded on a recording medium 62 by a recording apparatus 53, and outputs the resultant analog image signal Van1 to a display 52 and the recording apparatus 53.

The display 52 is formed of a CRT (Cathode-Ray Tube), an LCD (Liquid Crystal Display), or the like, and displays an image corresponding to the analog image signal Van1 output from the reproduction apparatus 51.

The recording apparatus 53 codes the analog image signal Van1 output from the reproduction apparatus 51 and records (copies) it on the recording medium 62.

That is, in the image processing system 50, copying of (an image signal of) content into the recording medium 62, etc., on the basis of the analog image signal Van obtained as a result of content recorded on the recording medium (for example, the recording medium 61 or the recording medium 62) being reproduced and decoded is possible. As a result of being decoded as will be described later, each time content is copied, the image quality (for example, the S/N (Signal-to-Noise) ratio and the evaluation of visual deterioration) are deteriorated.

It is also possible for the recording apparatus 53 to play back an image that is coded so as to be recorded on the recording medium 62 and to display it on a display 83. This makes it possible for the user to confirm, for example, the quality of an image when an image (copy) recorded on the recording medium 62 is reproduced by a predetermined reproduction apparatus (for example, the reproduction apparatus 51).

Details of the reproduction apparatus 51 and the recording apparatus 53 will be described below.

First, an example of the configuration of the reproduction apparatus 51 will be described.

The decoding section 71 of the reproduction apparatus 51 decodes a coded digital image signal (coded digital image signal of original content) read from the recording medium 61 and a coded digital image signal (coded digital image signal of copied content) read from the recording medium 62, and supplies the resultant decoded digital image signal Vdg0 to a D/A conversion section 72.

The D/A (Digital-to-Analog) conversion section 72 converts the decoded digital image signal Vdg0 supplied from the decoding section 71 into an analog signal, and outputs the resultant analog image signal Van1 to the display 52 and the recording apparatus 53.

Next, an example of the configuration of the recording apparatus 53 will be described.

The recording section (coding device) 81 codes the analog image signal Van1 supplied from the reproduction apparatus 51 into a coded digital image signal Vcd1, and records it on the recording medium 62 or supplies it to a reproduction section 82.

That is, the A/D (Analog-to-Digital) conversion section 91 of the recording section 81 converts the analog image signal Van1 supplied from the reproduction apparatus 51 into a digital signal, and supplies the resultant digital image signal Vdg1 to a coding section 92.

The coding section 92 codes the digital image signal Vdg1 supplied from the A/D conversion section 91, and supplies the resultant coded digital image signal Vcd1 to a medium recording section 93 and (a decoding section 94 of) the reproduction section 82.

The medium recording section 93 records the coded digital image signal Vcd1 supplied from the coding section 92 on the recording medium 62 (copying using the analog image signal Van1 from the reproduction apparatus 51 is performed).

The reproduction section (decoding device) 82 reproduces the same coded digital image signal Vcd1 as the coded digital image signal Vcd1 recorded on the recording medium 62, which is supplied from the recording section 81, and displays the played image on the display 83.

That is, the decoding section 94 of the reproduction section 82 decodes the coded digital image signal Vcd1 supplied from the coding section 92 of the recording section 81, and supplies the resultant decoded digital image signal Vdg2 to a D/A conversion section 95.

The D/A conversion section 95 converts a decoded digital image signal Vdg2 supplied from the decoding section 94 into an analog signal, and outputs the resultant analog image signal Van2 to the display 83.

The display 83 is formed of a CRT, an LCD, or the like, and displays an image corresponding to the analog image signal Van2 output from (the D/A conversion section 95 of) the reproduction section 82. This makes it possible for the user to confirm the image when the coded digital image signal Vcd1 recorded on the recording medium 62 is reproduced again and displayed.

Figure 3:
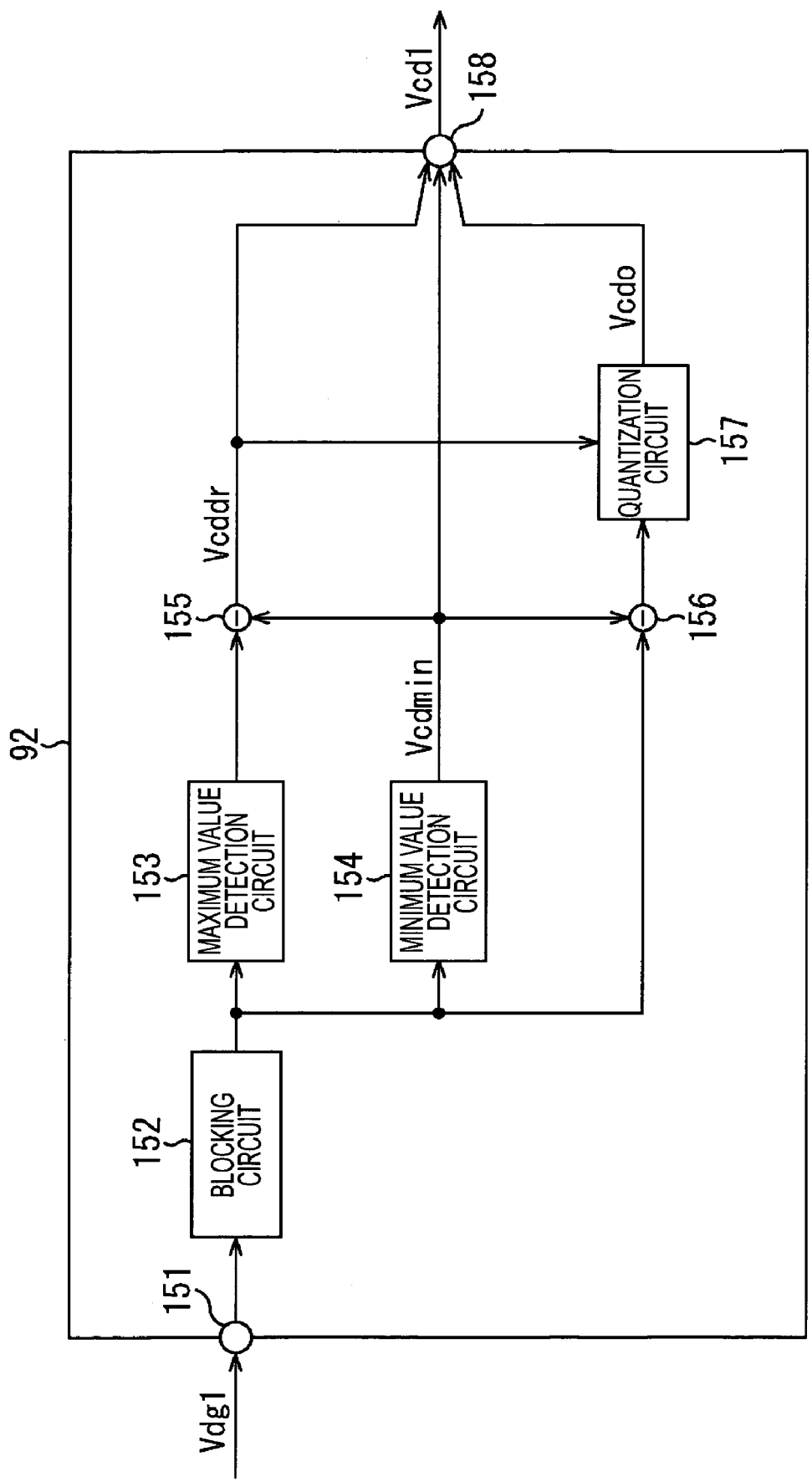
FIG. 3 is a block diagram showing an example of the configuration of a coding section 92 of FIG. 2 according to a first embodiment of the present invention.

Next, referring to FIG. 3, a description will be given of an example of the configuration of the first embodiment of the coding section 92 of the recording section 81 of the recording apparatus 53. In this coding section 92, an ADRC (Adaptive Dynamic Range Coding) process is performed.

A digital image signal Vdg1 (input image) supplied from the A/D conversion section 91 (FIG. 2) to the coding section 92 is input to an input terminal 151, and the digital image signal Vdg1 is supplied in frame units to the blocking circuit 152.

Figure 4:
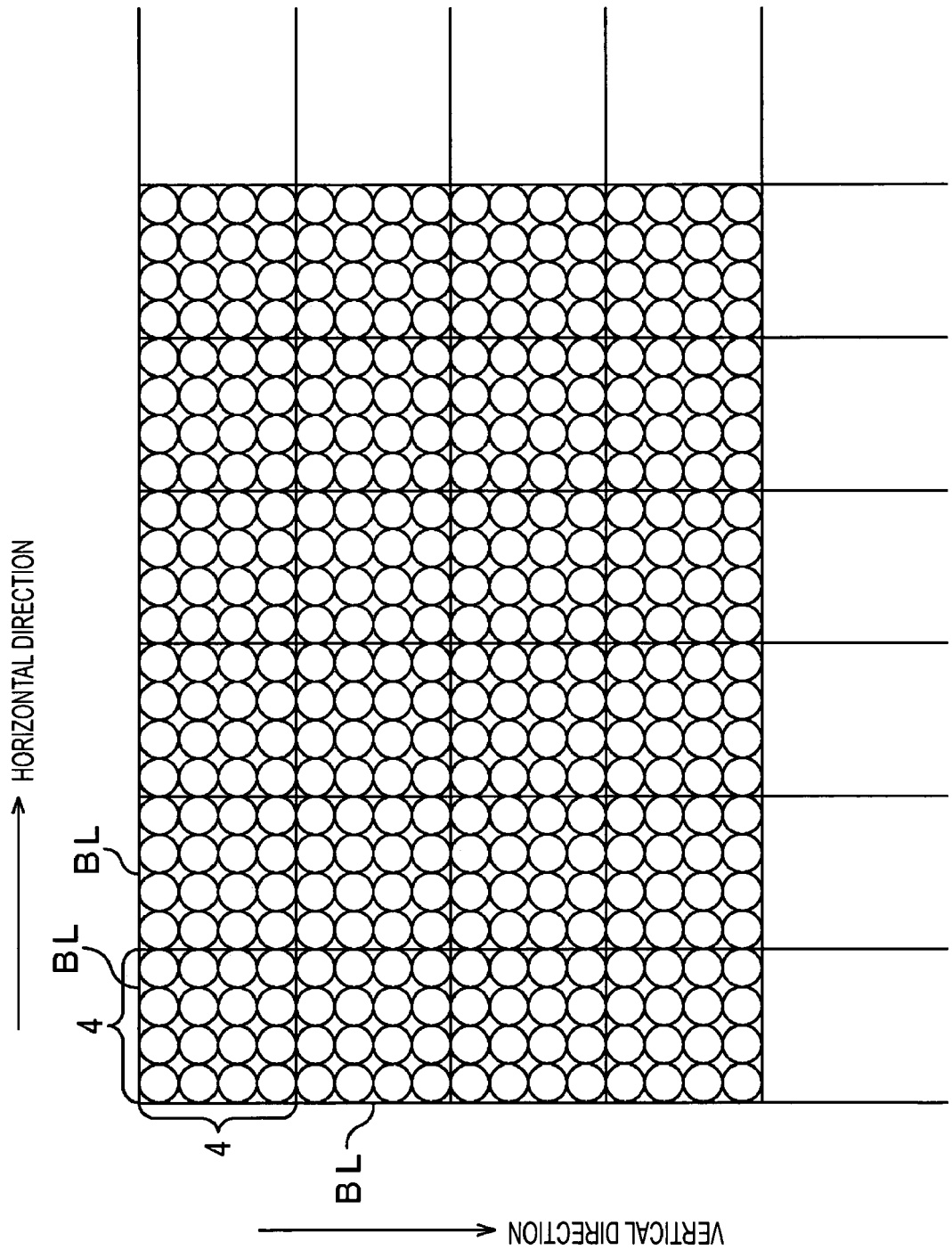
FIG. 4 illustrates a process of a blocking circuit 152 of FIG. 3.

The blocking circuit 152 divides an input frame (image of an effective screen) having a predetermined number of pixels, such as 640×480 pixels, corresponding to the digital image signal Vdg1 supplied via the input terminal 151, into, for example, a block BL having a size of 4×4 pixels (the horizontal direction×the vertical direction), as shown in FIG. 4. Circle marks (○) in FIG. 4 indicate each pixel forming the frame.

The blocking circuit 152 supplies each of the divided blocks BL, which is sequentially set as a block of interest BLc, to each of a maximum value detection section 153, a minimum value detection section 154, and a subtractor 156.

The maximum value detection section 153 detects a maximum value Vcdmax of the pixel values of the pixels forming the block of interest BLc supplied from the blocking circuit 152, and supplies the maximum value Vcdmax to the subtractor 155.

The minimum value detection section 154 detects a minimum value Vcdmin of the pixel values of the pixels forming the block of interest BLc supplied from the blocking circuit 152, and supplies the minimum value Vcdmin to each of the subtractor 155, a subtractor 156, and an output terminal 158.

The subtractor 155 subtracts the minimum value Vcdmin of the block of interest BLc, which is supplied from the minimum value detection section 154, from the maximum value Vcdmax of the block of interest BLc supplied from the maximum value detection section 153, and supplies the subtraction result (that is, the dynamic range Vcddr (=Vcdmax−Vcdmin) of the pixel value of the block of interest BLc) to each of a quantization circuit 157 and the output terminal 158.

The subtractor 156 subtracts the minimum value Vcdmin supplied from the minimum value detection section 154, from the pixel value of each pixel forming the block of interest BLc supplied from the blocking circuit 152, and supplies the subtraction result (that is, the block of interest BLc that is offset by the amount of the minimum value Vcdmin) to the quantization circuit 157.

The quantization circuit 157 quantizes the pixel value of each pixel of the block of interest BLc (the block of interest BLc that is offset by the amount of the minimum value Vcdmin) supplied from the subtractor 156, in a quantization step determined on the basis of the dynamic range Vcddr supplied from the subtractor 155.

More specifically, if the number of quantization bits is set to n, the quantization circuit 157 sets a level range so that the dynamic range Vcddr (difference between the maximum value Vcdmax and the minimum value Vcdmin) is divided equally by $2^n-1$ in the output), and assigns an n-bit code signal depending on which level range the input data (pixel value) belongs to.

Figure 5:
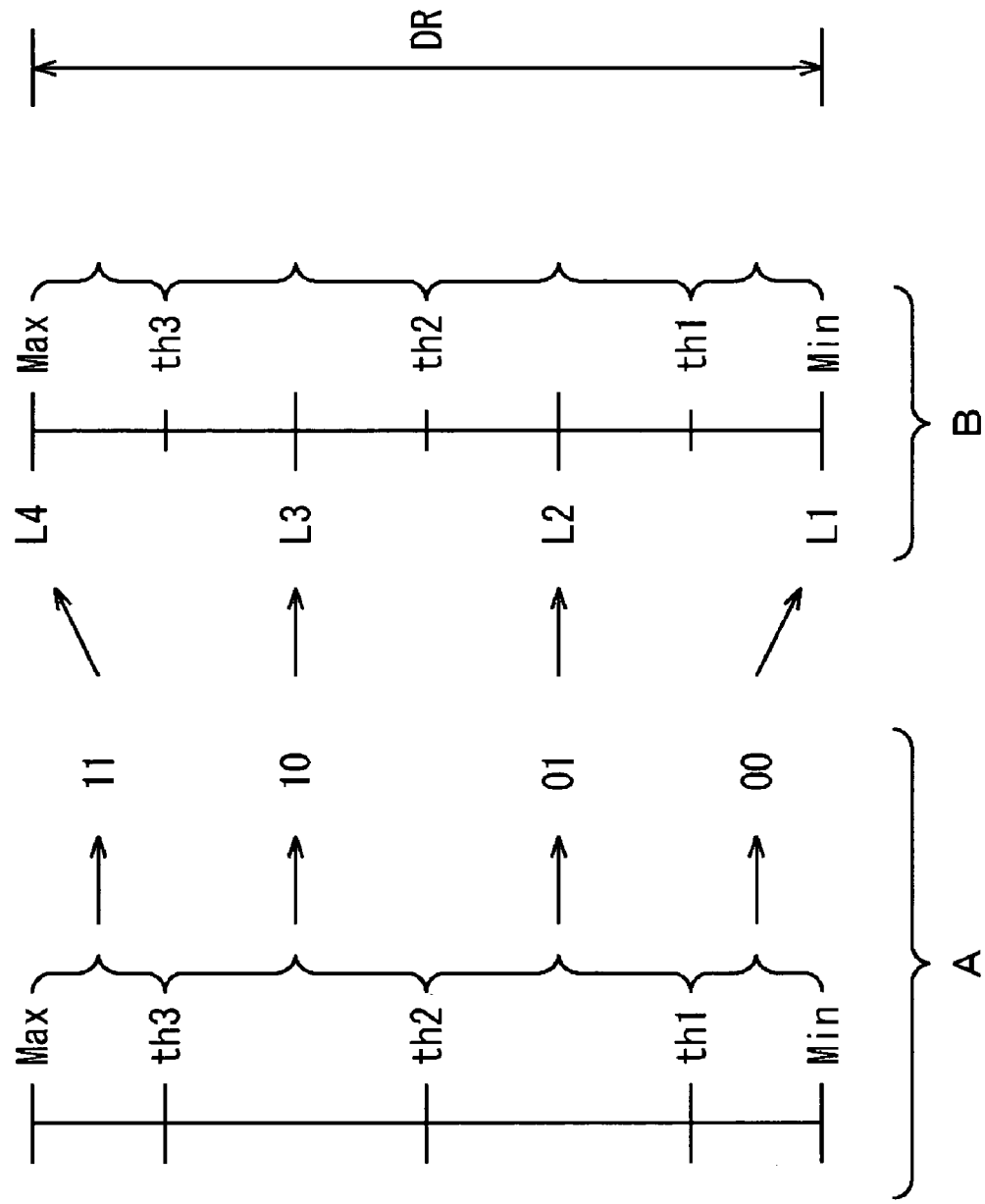
FIG. 5 illustrates a process of a quantization circuit 157 of FIG. 3.

Part A of FIG. 5 shows a level range when the number of quantization bits is 2 (n=2). In this case, the level ranges (that is, four level ranges of the minimum value Vcdmin to a threshold value th1, the threshold value th1 to a threshold value th2, the threshold value th2 to a threshold value th3, and the threshold value th3 to a maximum value Vcdmax) are set so that the dynamic range Vcddr is divided equally by 3 ($=2^2-1$). Depending on which level range the input data (pixel value) belongs to, a 2-bit code signal (00, 01, 10, or 11) is assigned to the input data (pixel value). The threshold values th1, th2, and th3 in part A of FIG. 5 are threshold values indicating boundaries of the level ranges.

Referring back to FIG. 3, the quantization circuit 157 outputs the assigned code signal, which is set as coded data Vcdo, to the output terminal 158.

The number of quantization bits n can be fixed to a predetermined number or can be changed on the basis of the dynamic range Vcddr. Alternatively, when the number of quantization bits n is changed on the basis of the dynamic range Vcddr, the greater the dynamic range Vcddr, the greater the number of quantization bits n becomes.

For example, when the image data can take a value 0 to 255, the number of quantization bits when 0< the dynamic range Vcddr<4 is set at 0; the number of quantization bits when 5< the dynamic range Vcddr<13 is set at 1; the number of quantization bits when 14< the dynamic range Vcddr<35 is set at 2; the number of quantization bits when 36< the dynamic range Vcddr<103 is set at 3; and the number of quantization bits when 104< the dynamic range Vcddr<255 is set at 4.

Referring back to FIG. 3, the minimum value Vcdmin, the dynamic range Vcddr, and the coded data (the code signal of each pixel value) Vcdo of each block BL (the block BL that is set as a block of interest BLc) are input to the output terminal 158. These pieces of the information for each block BL are output in frame units from the output terminal 158 to the medium recording section 93 and the reproduction section 82 (FIG. 2).

Figure 6:
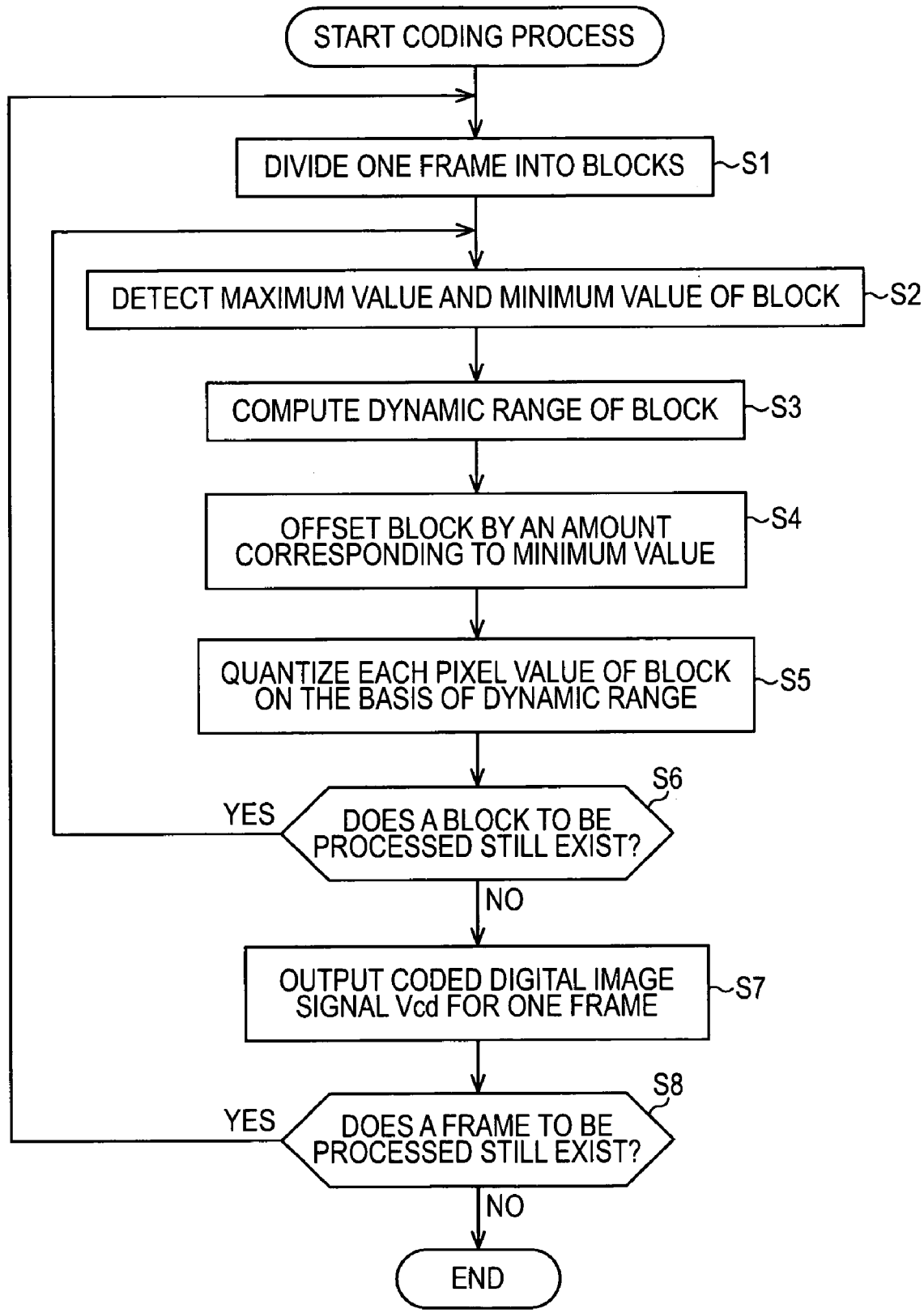
FIG. 6 is a flowchart illustrating a coding process according to the first embodiment of the present invention.

Next, the operation of the coding section 92 will be described with reference to the flowchart in FIG. 6.

In step S1, the blocking circuit 152 divides into blocks, the digital image signal Vdg1 for one frame, which is input via the input terminal 151 (FIG. 4).

Next, in step S2, the blocking circuit 152 supplies one of the blocks obtained as a result of the division into blocks, which is set as a block of interest BLc, to each of a maximum value detection section 153, a minimum value detection section 154, and a subtractor 156.

The maximum value detection section 153 detects the maximum value Vcdmax of the pixel values of the block of interest BLc, and the minimum value detection section 154 detects the minimum value Vcdmin of the pixel values of the block of interest BLc.

In step S3, the subtractor 155 subtracts the minimum value Vcdmin of the block of interest BLc from the maximum value Vcdmax of the block of interest BLc in order to compute the dynamic range Vcddr.

In step S4, the subtractor 156 subtracts the minimum value Vcdmin of the block of interest BLc from the pixel value of each pixel forming the block of interest BLc (the block of interest BLc is offset by the amount of the minimum value Vcdmin).

In step S5, the quantization circuit 157 quantizes the pixel value of each pixel of the block of interest BLc that is offset by the amount of the minimum value Vcdmin on the basis of the dynamic range Vcddr of the block of interest BLc (FIG. 5).

In step S6, the blocking circuit 152 determines whether or not all the blocks BL forming one frame are output as a block of interest BLc, that is, whether or not the processes of steps S2 to S5 described above are performed on all the blocks BL of one frame. If it is determined that a block BL that is not yet processed exists, the process returns to step S2, and processing of step S2 and subsequent steps is performed similarly.

When it is determined in step S6 that all the blocks BL are processed, the process proceeds to step S7, where the coded digital image signal Vcd1 for one frame, which is formed of the minimum value Vcdmin, the dynamic range Vcddr, and the coded data (the code signal of each pixel) of each of the blocks BL forming one frame, is supplied (output) from the output terminal 158 to the medium recording section 93 and the reproduction section 82.

In step S8, the blocking circuit 152 determines whether or not a frame to be processed still exists, that is, whether or not the digital image signal Vdg1 of the frame to be processed next is supplied from the A/D conversion section 91. When it is determined that a frame to be processed still exists, the process returns to step S1, and processing of step S1 and subsequent steps is performed similarly.

When it is determined in step S8 that there is no frame to be processed, that is, when a frame to be processed next is not supplied from the A/D conversion section 91, the processing is completed.

Next, a description will be given, with reference to FIG. 7, an example of the configuration of the first embodiment of the decoding section 94 of the reproduction section 82 of the recording apparatus 53. This decoding section 94 decodes the coded digital image signal Vcd1 coded by the coding section 92 (the first embodiment) of FIG. 3.

The coded digital image signal Vcd1 supplied from the coding section 92 (FIG. 3) is input to the input terminal 251, and the coded digital image signal Vcd1 is supplied in frame units to the data decomposition circuit 252.

The data decomposition circuit 252 decomposes the coded digital image signal Vcd1 input via the output terminal 251 into the minimum value Vcdmin, the dynamic range Vcddr, and the coded data (the code signal of each pixel) Vcdo of each block BL forming one frame, and obtains them.

The data decomposition circuit 252 supplies, for each block BL, the dynamic range Vcddr and the coded data Vcdo, which are obtained as a result of the decomposition, to a dequantization circuit 253, and supplies the minimum value Vcdmin to an adder 255.

The dequantization circuit 253 dequantizes the coded data (the code signal of each pixel of the block BL) Vcdo supplied from the data decomposition circuit 252 to a predetermined value based on the dynamic range Vcddr supplied from the data decomposition circuit 252, and outputs the value to an output adjustment circuit 254.

More specifically, as shown in parts A and B of FIG. 5, the dequantization circuit 253 dequantizes the code signal to a value L4 (value corresponding to the maximum value Vcdmax) when the code signal as the coded data Vcdo is 11, dequantizes the code signal to a value L3 (value corresponding to intermediate between the threshold value th3 and the threshold value th2) when the code signal is 10, dequantizes the code signal to a value L2 (value corresponding to intermediate between the threshold value th2 and the threshold value th1) when the code signal is 01, and dequantizes the code signal to a value L1 (value corresponding to the minimum value Vcdmin) when the code signal is 00.

The output adjustment circuit 254 changes the dequantized value for each pixel, which is supplied from the dequantization circuit 253, to a value closer to the quantization threshold value th for the quantization at the time of coding (vicinity value), and outputs the value to the adder 255.

Figure 8:
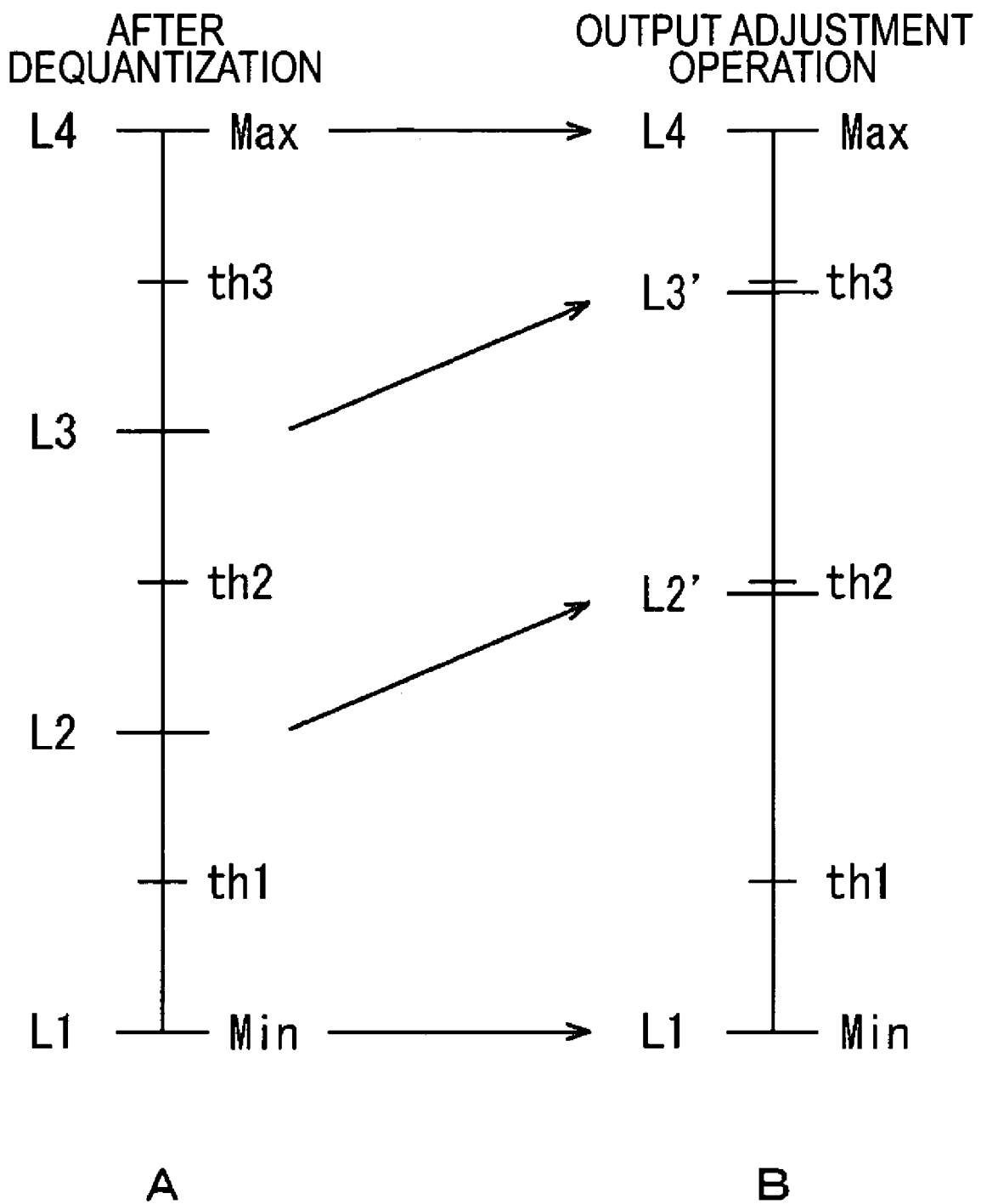
FIG. 8 is a diagram illustrating a process of an output adjustment circuit 254 of FIG. 7.

More specifically, the dequantized value is changed to a value closer to the threshold value in the higher region. For example, the dequantized value L2 shown in part A of FIG. 8 is changed to a value L2' closer to the threshold value th2 in the higher region, and the dequantized value L3 is changed to a value L3' closer to the threshold value th3 in the higher region.

Figure 9:
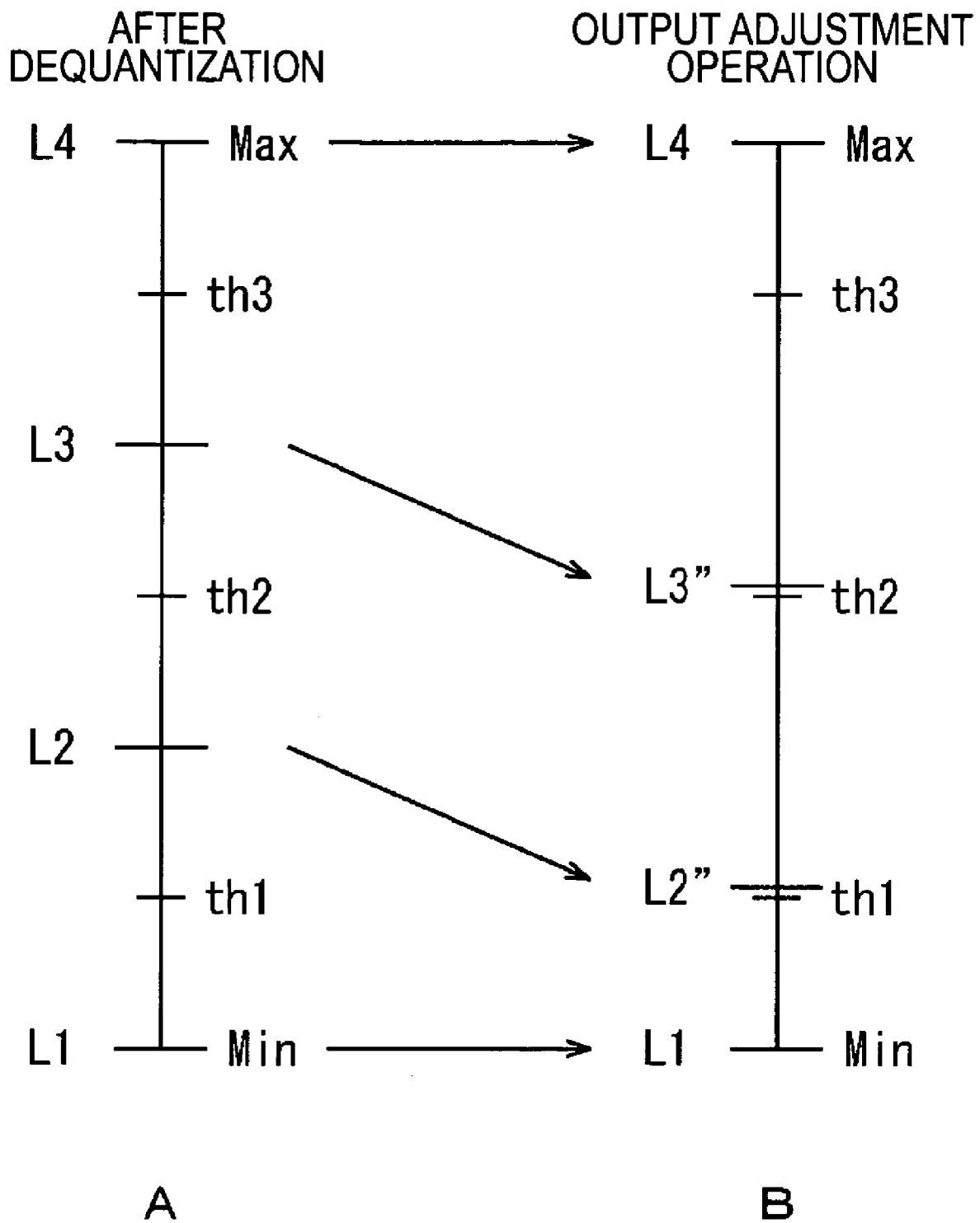
FIG. 9 is another diagram illustrating a process of the output adjustment circuit 254 of FIG. 7.

Furthermore, the dequantized value can also be changed to a value closer to a threshold value in the lower region. That is, the dequantized value L2 shown in part A of FIG. 9 is changed to a value L2" closer to the threshold value th1 in the lower region, and the dequantized value L3 is changed to a value L3" closer to the threshold value th2 in the lower region.

As details will be described later, value adjustments are not performed on the value L4 and the value L1, which are the maximum value and the minimum value, respectively.

Referring back to FIG. 7, the output adjustment circuit 254 supplies the dequantized value that is changed (adjusted) appropriately in this manner to the adder 255.

The adder 255 adds the minimum value Vcdmin supplied from the data decomposition circuit 252 to the dequantized value for each pixel, supplied from the output adjustment circuit 254, and supplies the resultant value (pixel value) to the block decomposition circuit 256.

The block decomposition circuit 256 returns the image value of each pixel of each block BL supplied from the adder 255 to the position before being divided into blocks, and outputs the resultant decoded digital image signal Vdg2 to the output terminal 257. The decoded digital image signal Vdg2 is output from the output terminal 257 to the D/A conversion section 95 (FIG. 2).

Next, the operation of the decoding section 94 will be described with reference to the flowchart in FIG. 10.

In step S21, the data decomposition circuit 252 decomposes the coded digital image signal Vcd1 for one frame, which is supplied from the coding section 92 of the recording section 81 via the input terminal 251, into the dynamic range Vcddr, the minimum value Vcdmin, and the coded data (the code signal of each pixel) Vcdo for each block BL, and obtains them.

The data decomposition circuit 252 supplies, for each block BL, the dynamic range Vcddr and the coded data Vcdo that are obtained as a result of the decomposition, to the dequantization circuit 253, and supplies the minimum value Vcdmin to the adder 255 for each block BL.

In step S22, the dequantization circuit 253 dequantizes the coded data (code signal of each pixel forming one block BL) Vcdo supplied from the data decomposition circuit 252 to a predetermined value on the basis of the dynamic range Vcddr supplied similarly from the data decomposition circuit 252 (part B of FIG. 5), and supplies the predetermined value to the output adjustment circuit 254.

Next, in step S23, the output adjustment circuit 254 changes (adjusts) each dequantized value L supplied from the dequantization circuit 253 to a value (vicinity value) closer to the quantization threshold value th for quantization at the time of coding (FIG. 8 or FIG. 9), and supplies the value to the adder 255.

In step S24, the adder 255 adds the minimum value Vcdmin supplied from the data decomposition circuit 252 to each dequantized value L whose output is adjusted, which is supplied from the output adjustment circuit 254 (returns the offset), and supplies the resultant value (pixel value) to the block decomposition circuit 256.

In step S25, the block decomposition circuit 256 arranges the pixel values so that the sequence of the pixel values supplied from the adder 255 becomes the sequence for a raster scan (each image value of the block BL is returned to the position before being divided into blocks).

In step S26, the data decomposition circuit 252 determines whether or not a block BL to be processed still exists with respect to the blocks BL forming one frame. When it is determined that a block BL to be processed still exists, the process returns to step S22, and processing of step S22 and subsequent steps is performed similarly.

When it is determined in step S26 that all the blocks BL of one frame have been completely processed, the process proceeds to step S27, where the decoded digital image signal Vdg2 for one frame is supplied (output) from the output terminal 257 to the D/A conversion circuit 95.

In step S28, the data decomposition circuit 252 determines whether or not a frame to be processed still exists, that is, whether or not a frame to be processed next is supplied from the coding section 92. When it is determined that a frame to be processed still exists, the process returns to step S21, and processing of step S21 and subsequent steps is performed similarly.

When it is determined in step S28 that a frame to be processed does not exist, that is, when a frame to be processed next is not supplied from the coding section 92, the processing is completed.

In the foregoing, the configuration and the operation of the decoding section 94 of the reproduction section 82 of the recording apparatus 53 are described. The decoding section 71 of the reproduction apparatus 51 has a configuration identical to that of the decoding section 94, and can operate similarly to the decoding section 94 in order to decode the coded digital image signal Vcd1 coded by the coding section 92 (the coded digital image signal Vcd1 recorded on the recording medium 62).

Next, a description will be given below of the principles on which the image quality of a copy (for example, the S/N ratio) is deteriorated each time content (image) is copied in the above-described image processing system 50.

The analog image signals Van1 and Van2 output from (the D/A conversion section 72) of the reproduction apparatus 51 and (the D/A conversion section 95) of the reproduction section 82 usually have distortion due to white noise when the decoded digital image signals Vdg0 and Vdg2 are converted into analog signals by the D/A converters 72 and 95 (hereinafter referred to as "analog distortion"). Therefore, even in the still portion at the same position in the time direction and where variations are small in the time direction, the pixel value changes (varies) during A/D conversion (in the A/D conversion section 91 of the recording section 81) when coding is performed.

Figure 10:
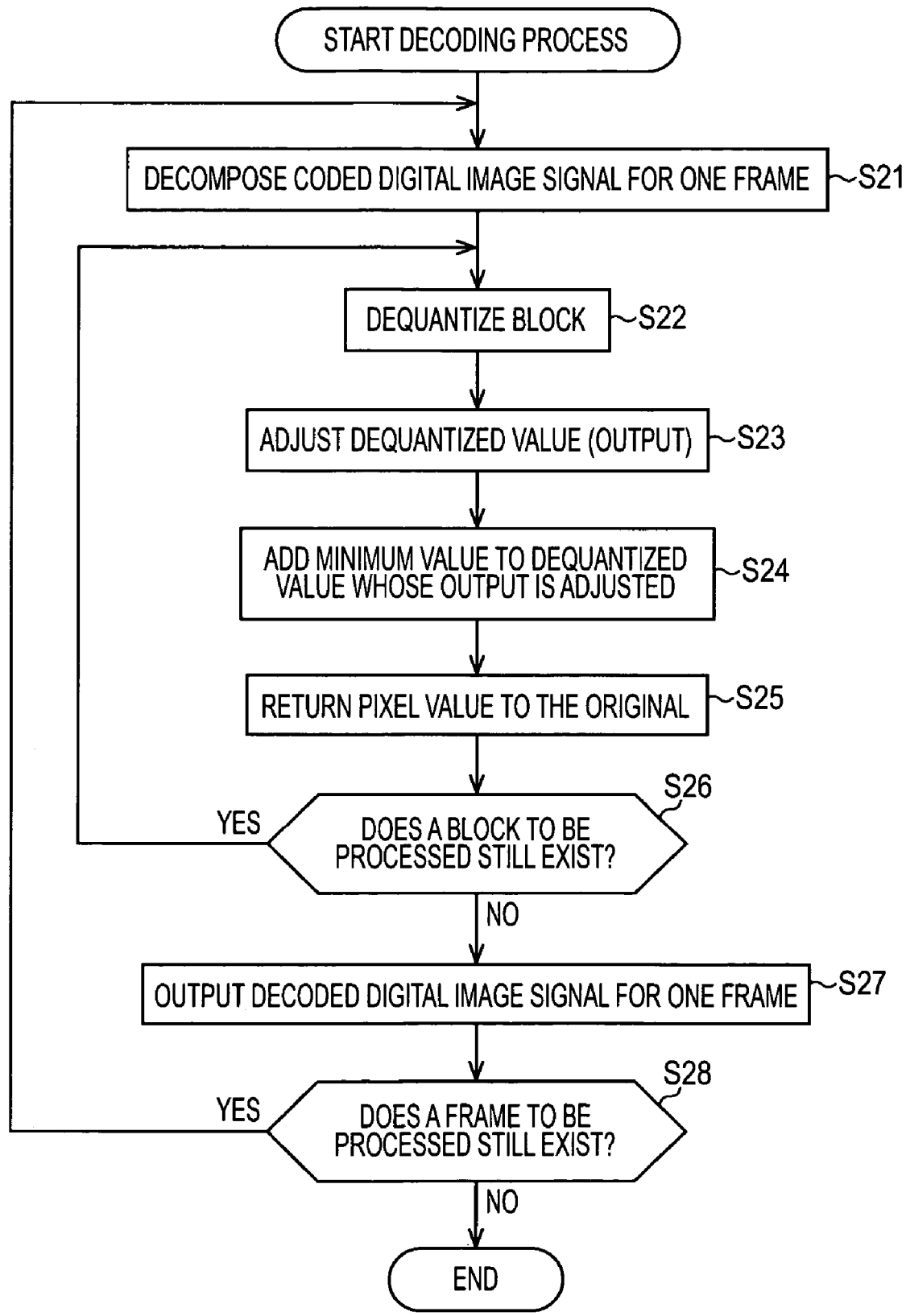
FIG. 10 is a flowchart illustrating a decoding process according to the first embodiment of the present invention.
Figure 11:
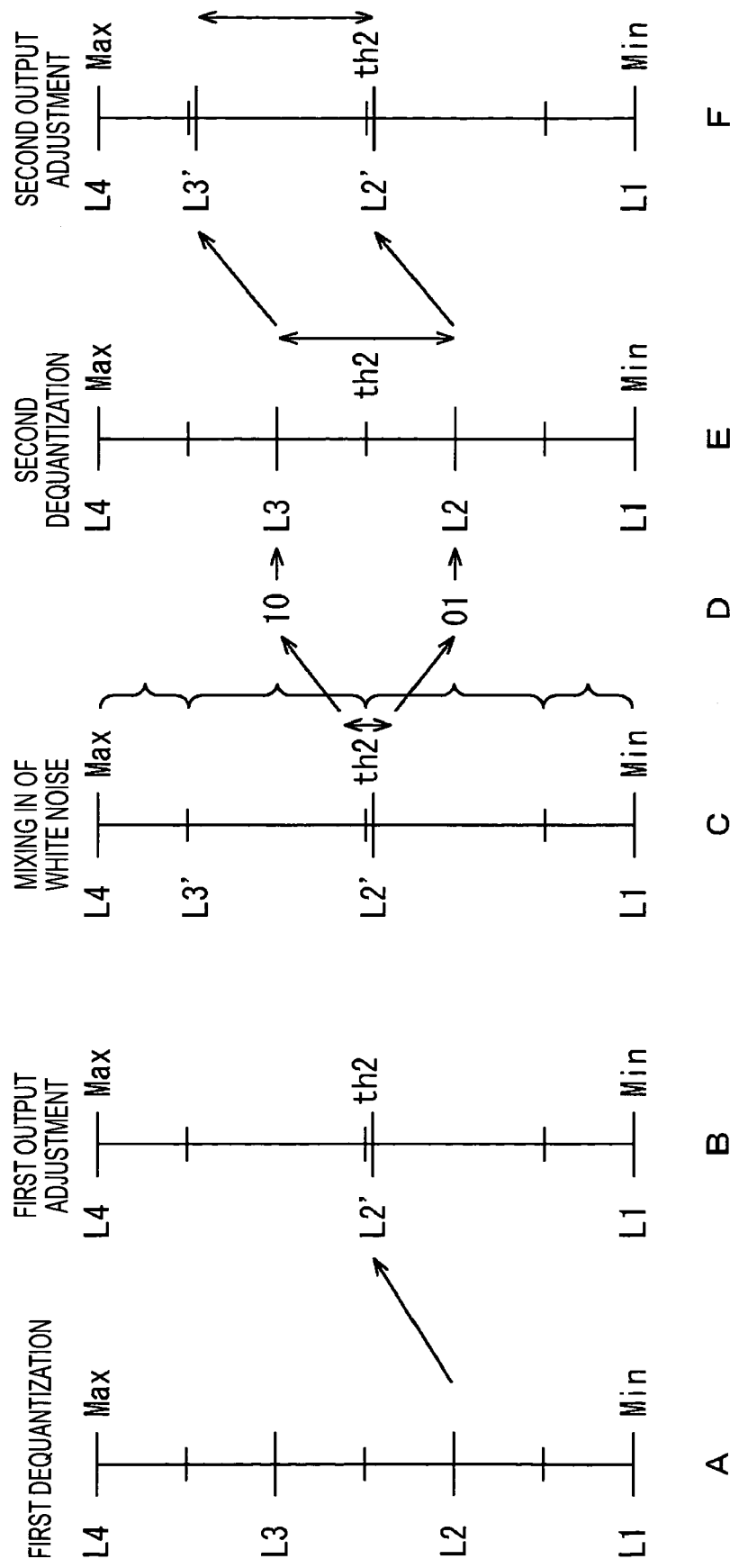
FIG. 11 illustrates a decoding process according to the first embodiment of the present invention.

The coded digital image signal Vcd recorded on the recording medium 61 is reproduced and decoded by the decoding section 71 of the reproduction apparatus 51 (FIG. 10), and the dequantized value L2 is subjected to a first dequantization in the decoding section 71 of the reproduction apparatus 51, as shown in, for example, part A of FIG. 11, and is adjusted (changed) to a value L2' closer to the threshold value th2 in the higher region, as shown in part B of FIG. 11 (first output adjustment in the decoding section 71 of the reproduction apparatus 51). As a consequence, when the value L2' as a pixel value varies in A/D conversion in the A/D conversion section 91 of the recording section 81 as a result of analog distortion being added to the analog signal Van1 after D/A conversion in the D/A conversion section 72, even if the variation is small, the value L2' exceeds (extends over) the threshold value th2 for coding (quantization) in the coding section 92, as shown in part C of FIG. 11. Therefore, as shown in part D of FIG. 11, the pixel value to which a code 01 of the original value L2 should be assigned can be quantized to a code 10. That is, in the second dequantization in the decoding section 94 of the reproduction section 82, since the pixel value that should be dequantized to the original value L2 can also be dequantized to the value L3, as shown in part E of FIG. 11, the pixel value greatly varies. As a result, the image on which a second decoding is performed, which is displayed on the display 83, deteriorates in image quality when compared to the image on which the first decoding is performed, which is displayed on the display 52 (large distortion occurs when the image data is viewed in the time direction).

As a result of further subsequent decoding (as a result of reproduction and decoding for the purpose of making copies), the pixel value dequantized to the value L3 is adjusted so as to be output as a value L3', as shown in part F of FIG. 11.

The reason why the maximum value L4 and the minimum value L1 are not changed is that, since the dynamic range of the entire block does not greatly change even if the values vary a little, the characteristics of the quantizer defined by the dynamic range do not greatly change.

On the basis of the principles described above, in the above-described image processing system 50, each time content (image) is copied (each time decoding and coding are repeated), the image quality (for example, the S/N ratio) is deteriorated. As a result, since it has no meaning to copy content, copying using an analog image signal is not performed (illegal copying can be prevented).

Figure 12:
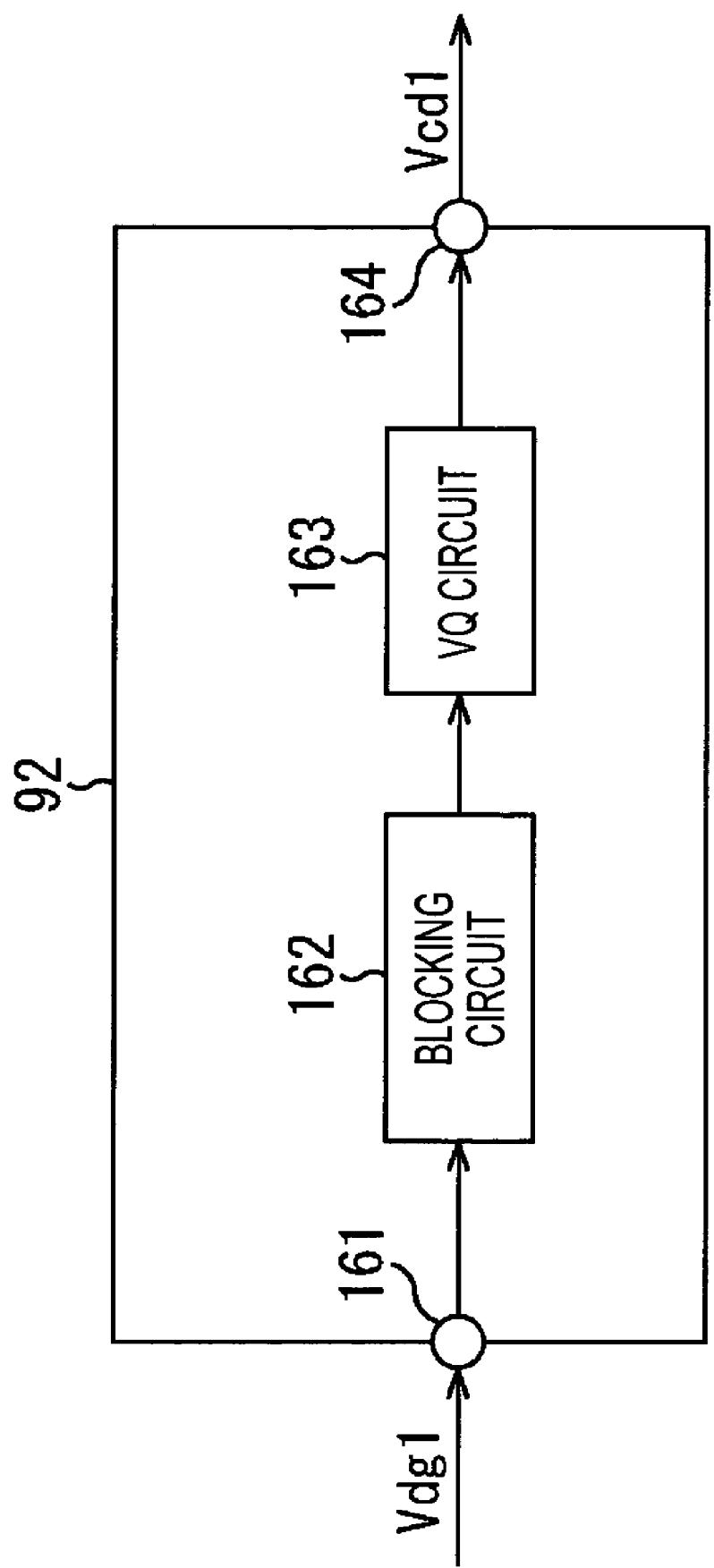
FIG. 12 is a block diagram showing an example of the configuration of the coding section 92 of FIG. 2 according to a second embodiment of the present invention.

FIG. 12 shows an example of the configuration of a second embodiment of the coding section 92 of the recording section 81 of the recording apparatus 53. In this coding section 92, vector quantization is performed.

The digital image signal Vdg1 (input image) supplied from the A/D conversion section 91 (FIG. 2) is input to the input terminal 161, and the digital image signal Vdg1 is supplied to the blocking circuit 162.

The blocking circuit 162 divides an input frame having a predetermined number of pixels, such as 640×480 pixels, corresponding to the digital image signal Vdg1 supplied via the input terminal 161, into, for example, a block BL of a size of 4×4 pixels (the horizontal direction×the vertical direction), as shown in FIG. 4.

The blocking circuit 162 supplies each of the divided blocks BL, which is sequentially set as a block of interest BLc, to the vector quantization (VQ) circuit 163.

The vector quantization circuit 163 performs vector quantization on the block BL supplied from the blocking circuit 162, and outputs the resultant code to the output terminal 164.

Vector quantization is performed in such a manner that, for example, a codebook learnt by an LBG (Linde Buzo Gray) algorithm using many ordinary images is provided and the vector of the block BL and the code of a minimum Euclid distance are selected from the codebook.

The code is input for each block BL to the output terminal 164. The code of each block BL is output as coded data Vcd1 in frame units from the output terminal 164 to the medium recording section 93 and the reproduction section 82 (FIG. 2).

Figure 13:
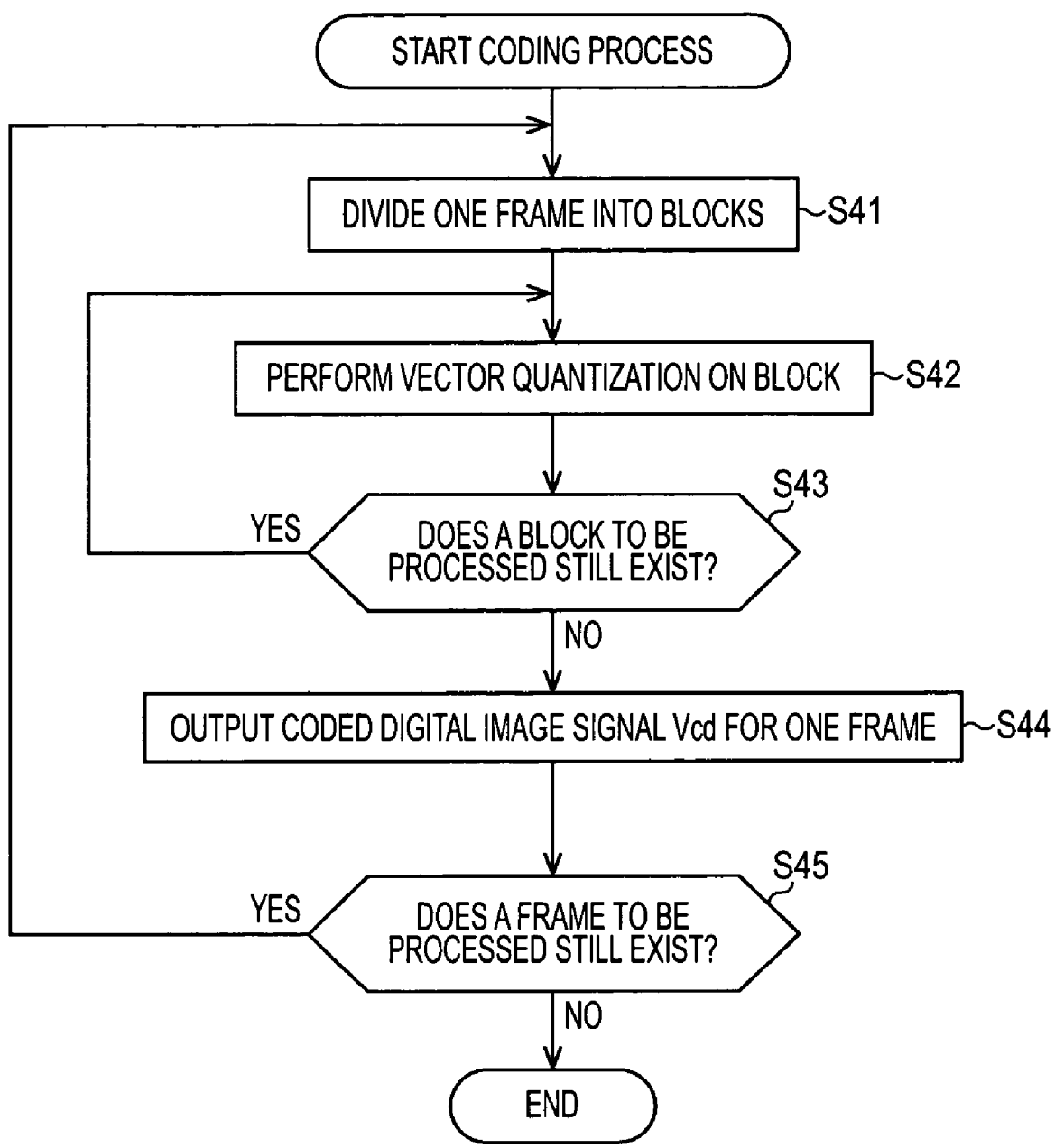
FIG. 13 is a flowchart illustrating a coding process according to the second embodiment of the present invention.

The operation of the coding section 92 of FIG. 12 will now be described below with reference to the flowchart in FIG. 13.

In step S41, the blocking circuit 162 divides the digital image signal Vdg1 for one frame, which is input via the input terminal 161, into blocks (FIG. 4).

In step 42, the blocking circuit 162 supplies one of the blocks obtained as a result of the division into blocks, which is set as a block of interest BLc, to the vector quantization circuit 163. The vector quantization circuit 163 performs vector quantization on the block of interest BLc.

In step S43, the blocking circuit 162 determines whether or not all the blocks BL forming one frame are output as a block of interest BLc, that is, whether or not a vector quantization process is performed on all the blocks BL of one frame. When it is determined that a block BL that is not yet processed exists, the process returns to step S42, and processing of step S42 and subsequent steps is performed similarly.

When it is determined in step S43 that all the blocks BL have been processed, the process returns to step S44, where the coded digital image signal Vcd1 for one frame is supplied (output) from the output terminal 164 to the medium recording section 93 and the decoding section 94.

In step S45, the blocking circuit 162 determines whether or not a frame to be processed still exists, that is, whether or not a frame to be processed next is supplied from the A/D conversion section 91. When it is determined that a frame to be processed still exists, the process returns to step S41, and processing of step S41 and subsequent steps is performed similarly.

When it is determined in step S45 that a frame to be processed does not exist, that is, when a frame to be processed next is not supplied from the A/D conversion section 91, the processing is completed.

FIG. 14 shows an example of the configuration of the second embodiment of the decoding section 94 of the reproduction section 82 of the recording apparatus 53. This decoding section 94 decodes the coded digital image signal Vcd1 coded by the coding section 92 (the second embodiment) of FIG. 12.

The coded digital image signal Vcd1 supplied from the coding section 92 (FIG. 12) is input to the input terminal 261, and the coded digital image signal Vcd1 is supplied to the inverse vector quantization (VQ) circuit 262.

The inverse vector quantization circuit 262 performs, for each block, inverse vector quantization on the coded digital image signal (code) Vcd1 supplied via the input terminal 261, and supplies the signal to the output adjustment circuit 263.

More specifically, the inverse vector quantization circuit 262 selects, from the codebook, a value (representative vector) (representative point) corresponding to the code supplied as the coded digital image Vcd1, and outputs the value. This codebook is the same as that used by the vector quantization circuit 163 of the coding section 92.

The output adjustment circuit 263 adjusts the dequantized value supplied from the inverse vector quantization circuit 262 and supplies the dequantized value to the block decomposition circuit 264.

More specifically, the output adjustment circuit 263 changes the dequantized value (the representative point P) in the vector space, shown in part A of FIG. 15, to a value of a vector closer to the quantization threshold value th (for example, the closest quantization threshold value th), as shown in part B of FIG. 15. As a result, each pixel value of the block BL changes.

Referring back to FIG. 14, the block decomposition circuit 264 returns the pixel value for each pixel of each block BL, which is supplied from the output adjustment circuit 263, to the position before being divided into blocks, and outputs the resultant decoded digital image signal Vdg2 to the output terminal 265. The decoded digital image signal Vdg2 is output from the output terminal 265 to the D/A conversion circuit 95 (FIG. 2).

Next, the operation of the decoding section 94 of FIG. 14 will be described with reference to the flowchart in FIG. 16.

In step S51, the inverse vector quantization circuit 262 inputs thereto the coded digital image signal Vcd1 for one frame, which is supplied from the coding section 92 of the recording section 81 via the input terminal 261. In step S52, the inverse vector quantization circuit 262 performs an inverse vector quantization on the block BL forming the frame.

Next, in step S53, the output adjustment circuit 263 changes (adjusts) each dequantized value supplied from the inverse vector quantization circuit 262 to a value (vicinity value) closer to the quantization threshold value th (part B of FIG. 15).

In step S54, the block decomposition circuit 264 arranges the pixel values supplied from the output adjustment circuit 254 so that the sequence thereof becomes a sequence for a raster scan (each pixel value of the block BL is returned to the position before being divided into blocks).

In step S55, the inverse vector quantization circuit 262 determines whether or not the inverse vector quantization process is performed on all the blocks BL forming one frame. When it is determined that a block BL that is not yet processed exists, the process returns to step S52, and processing of step S52 and subsequent steps is performed similarly.

When it is determined in step S55 that the inverse vector quantization process has been performed on all the blocks BL of one frame, the process proceeds to step S56, where the decoded digital image signal Vdg2 for one frame is supplied (output) from the output terminal 265 to the D/A conversion circuit 95.

In step S57, the inverse vector quantization circuit 262 determines whether or not a frame to be processed still exists, that is, whether or not a frame to be processed next is supplied from the coding section 92. When it is determined that a frame to be processed still exists, the process returns to step S51, and processing of step S51 and subsequent steps is performed similarly.

When it is determined in step S57 that a frame to be processed does not exist, that is, when a frame to be processed next is not supplied from the coding section 92, the processing is completed.

In the case of this example, also, the configuration and the operation of the decoding section 94 of the reproduction section 82 of the recording apparatus 53 are described. The decoding section 71 of the reproduction apparatus 51 has a configuration identical to that of the decoding section 94, and can operate similarly to the decoding section 94 in order to decode the coded digital image signal Vcd1 coded by the coding section 92 (the coded digital image signal Vcd1 recorded on the recording medium 62).

Next, a description will be given below of the principles on which the image quality of a copy is deteriorated each time content (image) is copied in the above-described image processing system 50.

Figure 17:
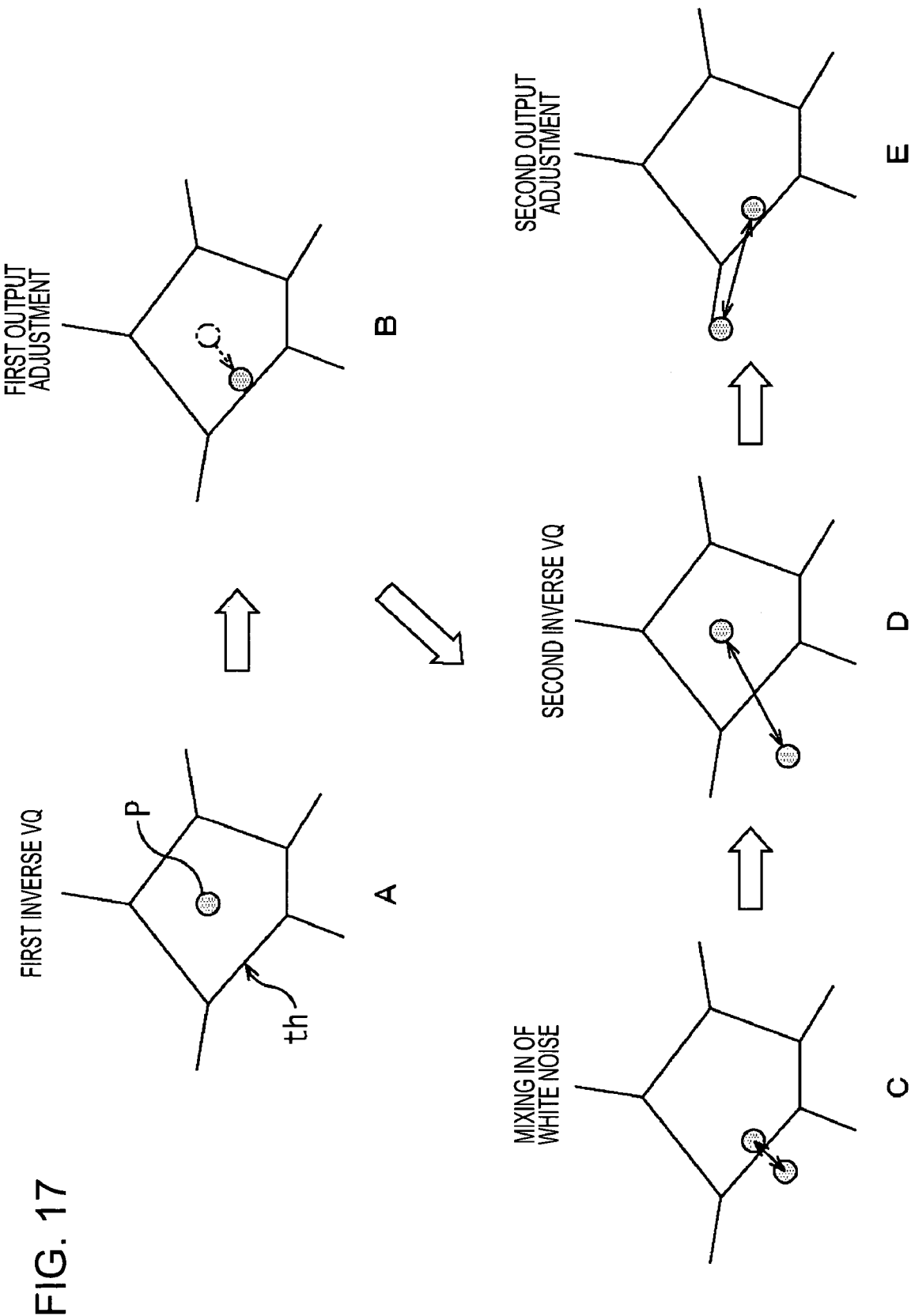
FIG. 17 illustrates the decoding process according to the second embodiment of the present invention.

For example, the dequantized representative point P shown in part A of FIG. 17 (first inverse vector quantization in the decoding section 71 of the reproduction apparatus 51) is adjusted (changed) to a value closer to the quantization threshold value th in the vector space, as shown in part B of FIG. 17 (first output adjustment in the decoding section 71 of the reproduction apparatus 51). As a consequence, if the representative point P is thereafter converted into an analog signal Van1, to which analog distortion is added, and varies in A/D conversion in the A/D conversion section 91 of the recording section 81, even if the variation is small, the representative point P exceeds (extends over) the threshold value th, as shown in part C of FIG. 17. That is, in the second inverse vector quantization in the decoding section 94 of the reproduction section 82, the representative point P greatly varies, as shown in part D of FIG. 17. As a result, the pixel values of the entire block BL vary, and a large distortion occurs visually (image quality is deteriorated).

As a result of subsequent further decoding (as a result of reproduction and decoding for the purpose of making copies), as shown in part E of FIG. 17, the representative point P is adjusted so as to be output as a value closer to another threshold value.

On the basis of such principles, in the above-described image processing system 50, each time content (image) is copied (each time decoding and coding are repeated), the image quality (for example, the S/N ratio) is deteriorated. As a result, since it has no meaning to copy content, copying using an analog image signal is not performed (illegal copying can be prevented).

Figure 18:
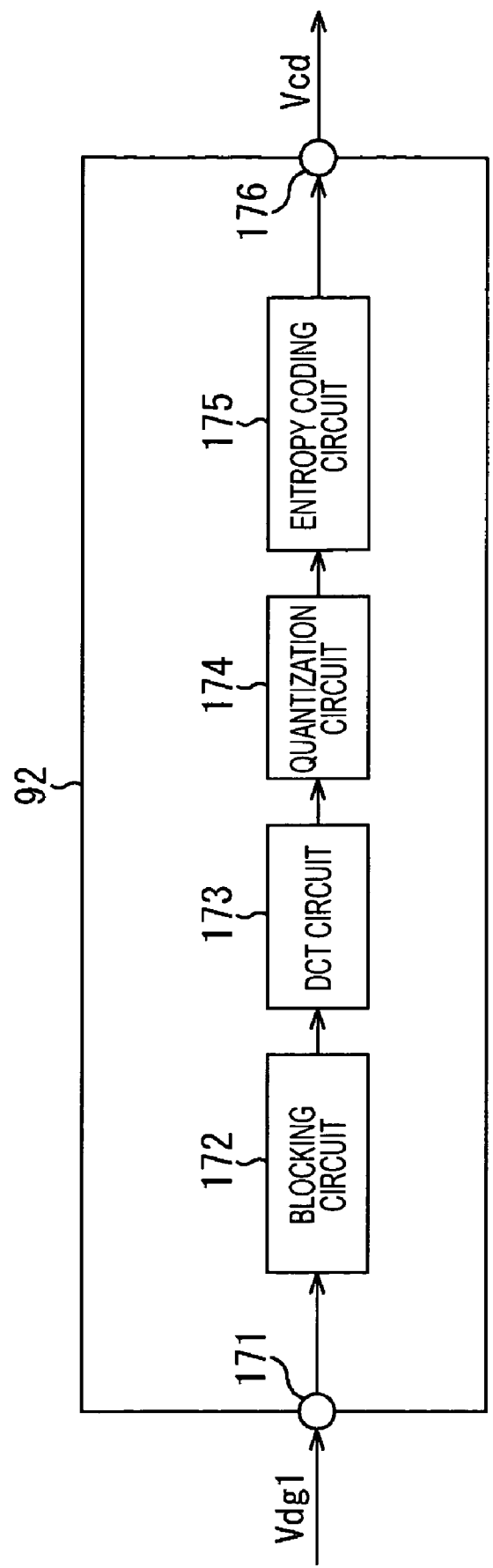
FIG. 18 is a block diagram showing an example of the configuration of the coding section 92 of FIG. 2 according to a third embodiment of the present invention.

FIG. 18 shows an example of the configuration of a third embodiment of the coding section 92 of the recording section 81 of the recording apparatus 53. In this coding section 92, coding for converting image data into a space frequency region is performed using an orthogonal transform, such as a discrete cosine transform (DCT). According to this coding, data compression can be performed by causing a transform coefficient to be deviated to a lower frequency range by using a correlation with adjacent pixels. In the case of this example, it is assumed that a DCT is used as an orthogonal transform.

The digital image signal Vdg1 (input image) supplied from the A/D conversion section 91 (FIG. 2) is input to the input terminal 171, and the digital image signal Vdg1 is supplied to the blocking circuit 172.

Figure 19:
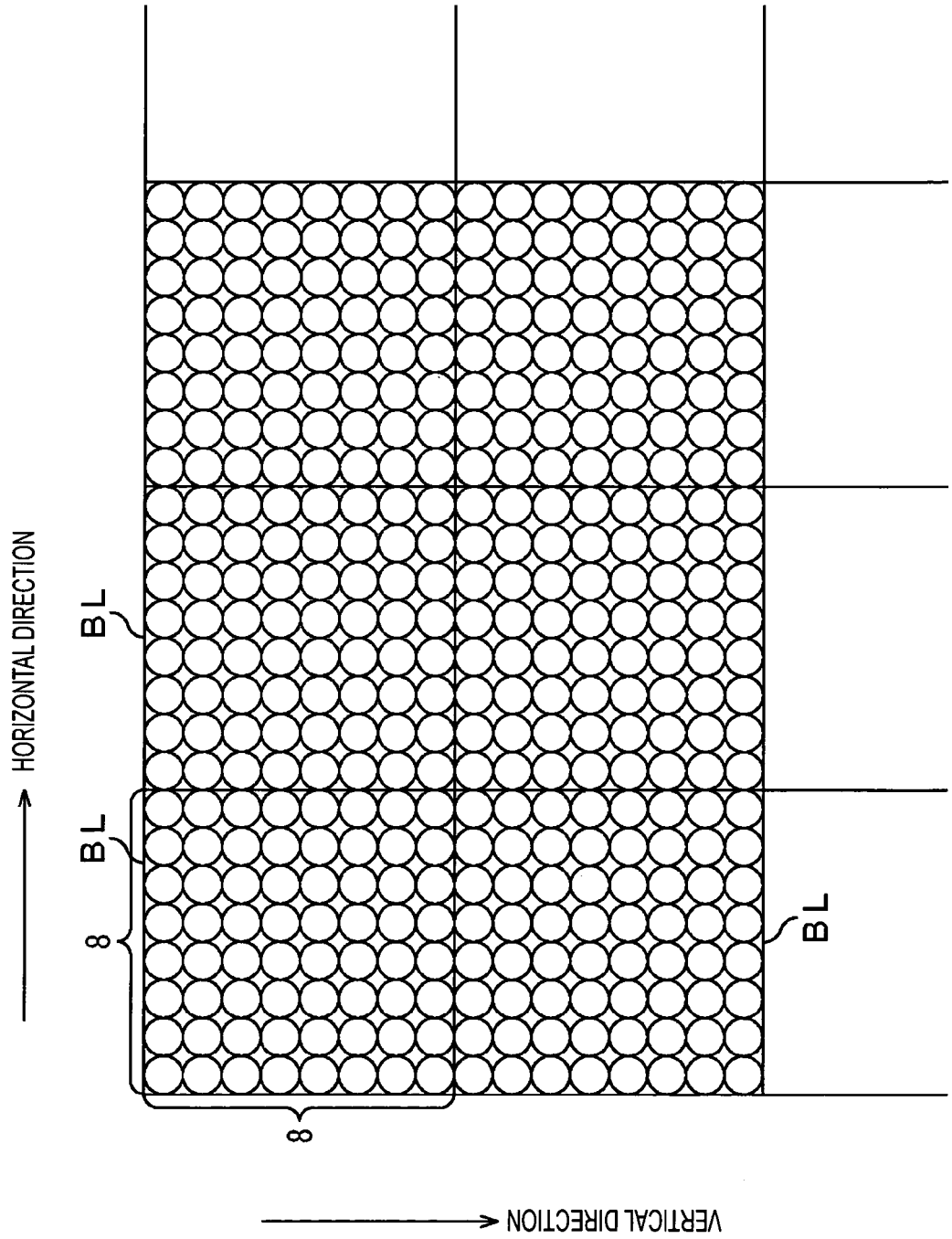
FIG. 19 illustrates a process of a blocking circuit 172 of FIG. 18.

The blocking circuit 172 divides an input frame having a predetermined number of pixels, such as 640×480 pixels, corresponding to the digital image signal Vdg1 supplied via the input terminal 171, into blocks BL having a size of 8×8 pixels, as shown in FIG. 19. Circle marks (◯) in FIG. 19 indicate each pixel forming the frame.

The blocking circuit 172 supplies each of the divided blocks BL, which is sequentially set as a block of interest BLc, to the DCT circuit 173.

The DCT circuit 173 performs a DCT as an orthogonal transform on the block BL supplied from the blocking circuit 172 in order to compute a DCT coefficient. The DCT circuit 173 supplies the computed DCT coefficient to the quantization circuit 174.

The quantization circuit 174 quantizes the DCT coefficient of the block BL supplied from the DCT circuit 173 by using a quantization table.

An entropy coding circuit 175 performs entropy coding, for example, Huffman coding, on the quantized DCT coefficient of the block BL, which is supplied from the quantization circuit 174, and outputs the resultant coded data to the output terminal 176.

Coded data of each block BL is output as coded data Vcd in frame units from the output terminal 176 to the medium recording section 93 and the reproduction section 82 (FIG. 2).

Figure 20:
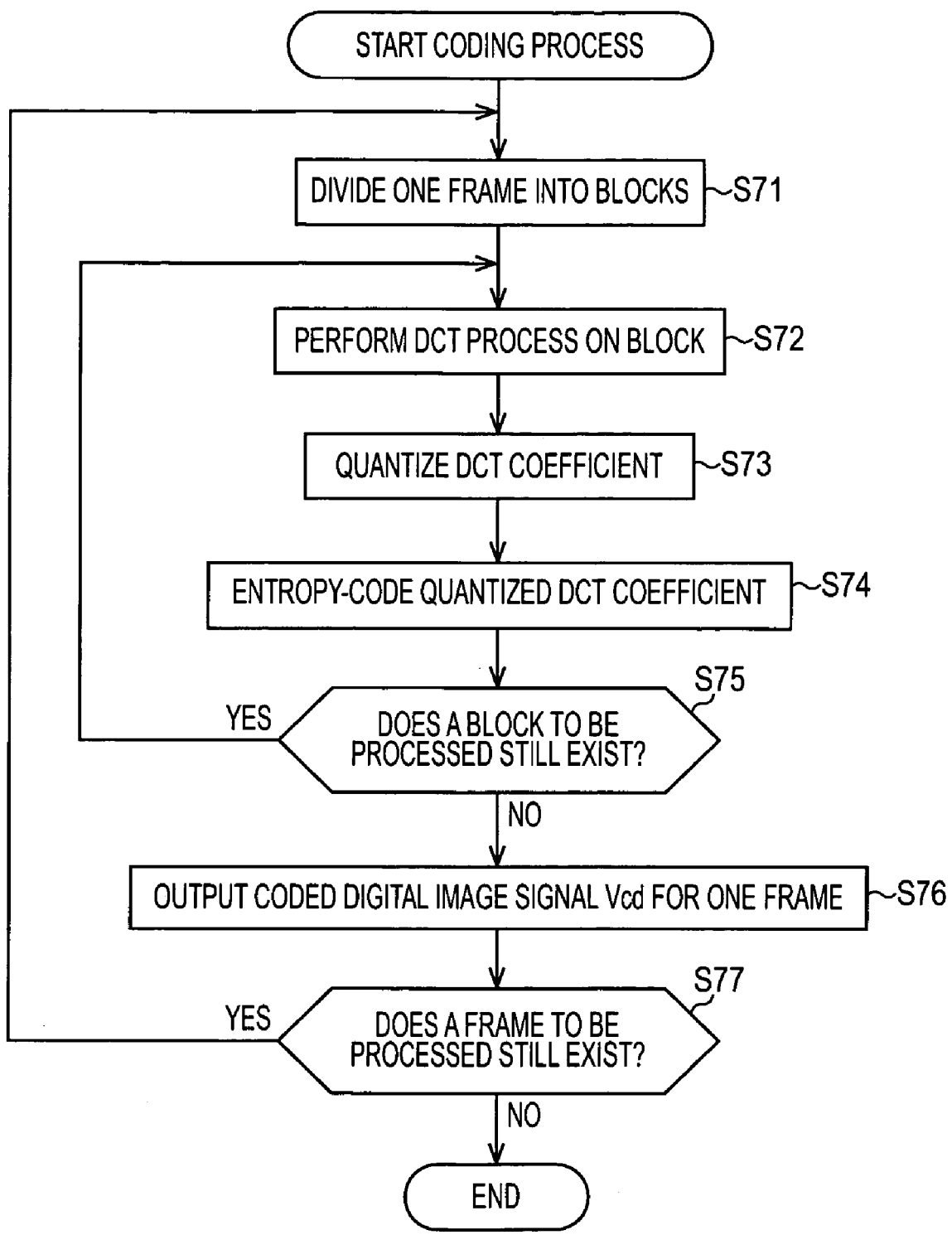
FIG. 20 is a flowchart illustrating a coding process according to the third embodiment of the present invention.

The operation of the coding section 92 of FIG. 18 will be described below with reference to the flowchart in FIG. 20.

In step S71, the blocking circuit 172 divides the digital image signal Vdg1 for one frame, which is input via the input terminal 171, into blocks (FIG. 19).

Next, in step S72, the blocking circuit 172 outputs one of the blocks BL forming one frame, as a block of interest BLc, to the DCT circuit 173. The DCT circuit 173 performs an orthogonal transform (DCT) process on the block of interest BL.

In step S73, the quantization circuit 174 quantizes the DCT coefficient supplied from the DCT circuit 173 by using a quantization table.

In step S74, the entropy coding circuit 175 performs entropy coding, for example, Huffman coding, on the quantized DCT coefficient of the block BL, which is supplied from the quantization circuit 164.

In step S75, the blocking circuit 172 determines whether or not all the blocks BL forming one frame have been output as a block of interest BLc, that is, whether or not steps S72 to S74 described above have been performed on all the blocks BL of one frame. When it is determined that a block BL that is not yet processed exists, the process returns to step S72, and processing of step S72 and subsequent steps is performed similarly.

When it is determined in step S75 that all the blocks BL have been processed, the process proceeds to step S76, where the coded digital image signal Vcd1 for one frame is supplied (output) from the output terminal 176 to the medium recording section 93 and the decoding section 94.

In step S77, the blocking circuit 172 determines whether or not a frame to be processed still exists, that is, whether or not a frame to be processed next is supplied from the A/D conversion section 91. When it is determined that a frame to be processed still exists, the process returns to step S71, and processing of step S71 and subsequent steps is performed similarly.

When it is determined in step S77 that a frame to be processed does not exist, that is, when a frame to be processed next is not supplied from the A/D conversion section 91, the processing is completed.

FIG. 21 shows an example of the configuration of the third embodiment of the decoding section 94 of the reproduction section 82 of the recording apparatus 53. This decoding section 94 decodes the coded digital image signal Vcd1 coded by the coding section 92 (the third embodiment) of FIG. 18.

The coded digital image signal Vcd1 supplied from the coding section 92 (FIG. 18) is input to the input terminal 271, and the coded digital image signal Vcd1 is supplied to an entropy decoding circuit 272.

The entropy decoding circuit 272 decodes the coded digital image signal Vcd1 (entropy-coded data, for example, Huffman-coded data) supplied via the input terminal 271, and supplies the resultant quantized DCT coefficient of the block BL to the dequantization circuit 273 for each block BL.

The dequantization circuit 273 dequantizes the quantized DCT coefficient of the block BL, which is supplied from the entropy decoding circuit 272, and supplies the resultant DCT coefficient to the output adjustment circuit 274.

The output adjustment circuit 274 performs output adjustment on the DCT coefficient of the block BL supplied from the dequantization circuit 273.

Figure 22:
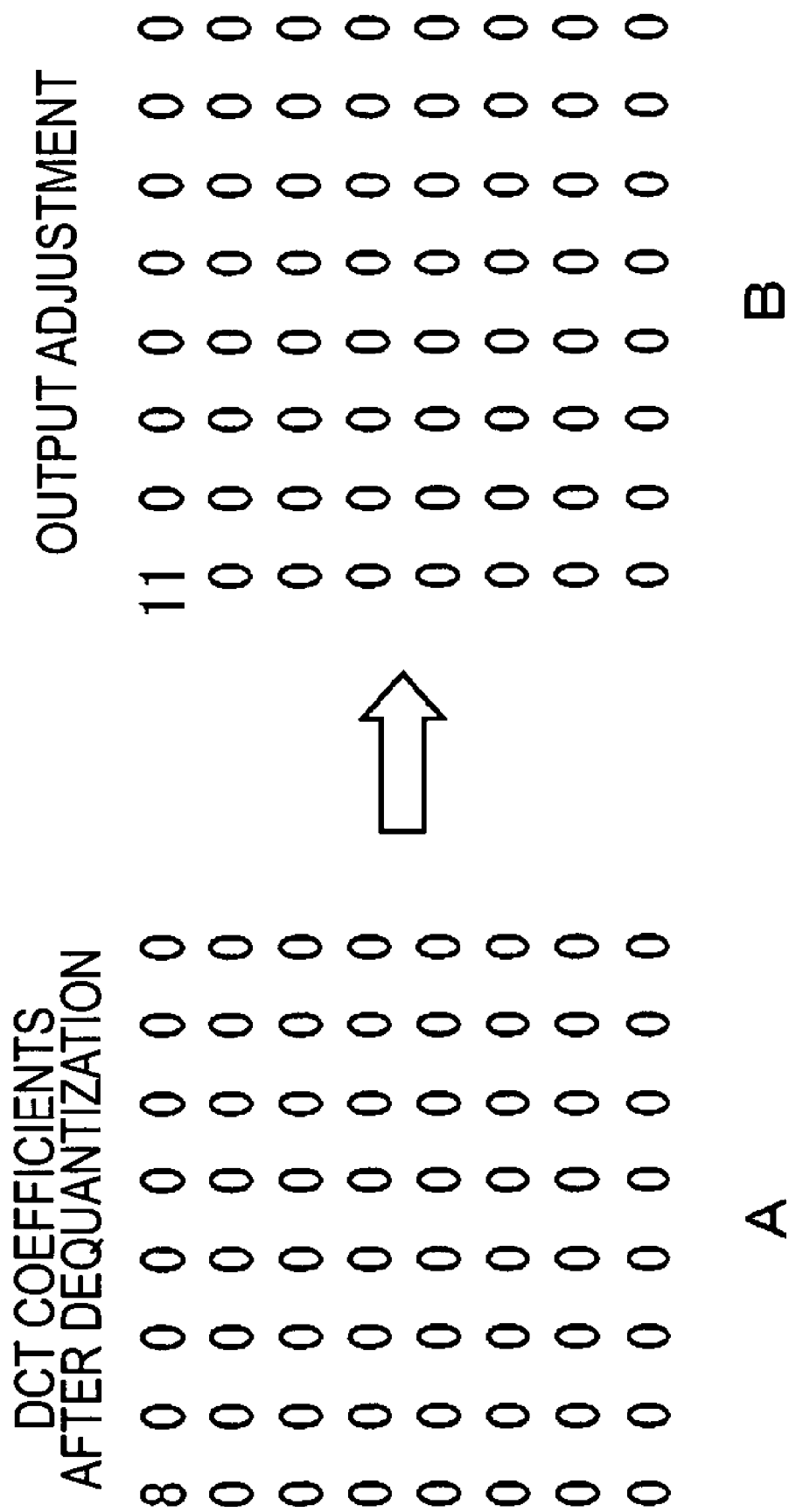
FIG. 22 illustrates a process of an output adjustment circuit 274 of FIG. 21.

More specifically, the output adjustment circuit 274 changes (adjusts), for example, the DCT coefficient (DCT coefficient having lowest frequency components) in the upper left, shown in part A of FIG. 22, to a value (vicinity value) closer to the quantization threshold value th, as shown in part B of FIG. 22. Since the DCT coefficient is a value of a multiple of 8 (1, 8, 16, and 24), the threshold value th becomes an intermediate value (4, 12, and 20) between them. That is, in the example of FIG. 22, the value 8 is changed to a value 11 closer to the threshold value 12.

Referring back to FIG. 21, the inverse DCT circuit 275 performs an inverse DCT process on the adjusted DCT coefficient of the block BL supplied from the output adjustment circuit 274, and supplies the resultant value (pixel value) to the block decomposition circuit 276.

The block decomposition circuit 276 returns each pixel value of the block supplied from the inverse DCT circuit 275 to the position before being divided into blocks, and outputs the resultant decoded digital image signal Vdg2 to the output terminal 277. The decoded digital image signal Vdg2 is output from the output terminal 277 to the D/A conversion circuit 95 (FIG. 2).

Next, the operation of the decoding section 94 of FIG. 21 will be described with reference to the flowchart in FIG. 23.

In step S91, the entropy decoding circuit 272 inputs thereto the coded digital image signal Vcd1 for one frame, which is supplied from the coding section 92 of the recording section 81 via the input terminal 271. In step S92, the entropy decoding circuit 272 performs entropy decoding on the data (entropy-coded DCT coefficient) of the block BL forming the frame.

Next, in step S93, the dequantization circuit 273 dequantizes the quantized DCT coefficient. In step S94, the output adjustment circuit 274 adjusts (changes) the dequantized DCT coefficient to a value closer to the quantization threshold value (part B of FIG. 22).

In step S95, the inverse DCT circuit 275 performs an inverse orthogonal transform (inverse DCT) on the DCT coefficient and supplies the resultant value (pixel value) to the block decomposition circuit 276.

In step S96, the block decomposition circuit 276 arranges the pixel values supplied from the inverse DCT circuit 275 so that the sequence thereof becomes a sequence for a raster scan.

In step S97, the entropy decoding circuit 272 determines whether or not a decoding process is performed on all the blocks BL forming one frame. When it is determined that a block BL that is not yet processed exists, the process returns to step S92, and processing of step S92 and subsequent steps is performed similarly.

When it is determined in step S97 that the decoding process is performed on all the blocks BL of one frame, the process proceeds to step S98, where the decoded digital image signal Vdg2 for one frame is supplied from the output terminal 277 to the D/A conversion circuit 95 (FIG. 2).

In step S99, the entropy decoding circuit 272 determines whether or not a frame to be processed still exists, that is, whether or not a frame to be processed next is supplied from the coding section 92. When it is determined that a frame to be processed still exists, the process returns to step S91, and processing of step S91 and subsequent steps is performed similarly.

When it is determined in step S99 that a frame to be processed does not exist, that is, when a frame to be processed next is not supplied from the coding section 92, the processing is completed.

In the case of this example, also, the configuration and the operation of the decoding section 94 of the reproduction section 82 of the recording apparatus 53 are described. The decoding section 71 of the reproduction apparatus 51 has a configuration identical to that of the decoding section 94 and can operate similarly to the decoding section 94 in order to decode the coded digital image signal Vcd1 coded by the coding section 92 (the coded digital image signal Vcd1 recorded on the recording medium 62).

Next, a description will be given below of the principles on which the image quality (for example, the S/N ratio) of copies is deteriorated each time content (image) is copied in the above-described image processing system 50.

The coded digital image signal Vcd recorded on the recording medium 61 is reproduced and decoded by the decoding section 71 of the reproduction apparatus 51. As shown in, for example, part A of FIG. 24, the DCT coefficient (value of 8) (value of the quantization table) is subjected to first dequantization and is adjusted (changed) to the value 11 closer to the threshold value 12 in the higher region, as shown in part B of FIG. 24 (first output adjustment). As a consequence, if the value is thereafter changed to the analog signal Van1, analog distortion is added thereto, and the pixel value varies in the A/D conversion in the A/D conversion section 91 of the recording section 81, even if the variation is small, the value 12 for coding (quantization) in the coding section 92 is obtained, as shown in part C of FIG. 24. That is, in the second quantization in the decoding section 94 of the reproduction section 82, since the DCT coefficient that should become an original value 8 can be a value 16 as shown in part-D of FIG. 24, the pixel values of the entire block greatly vary. As a result, the image quality of the image on which the second decoding is performed, which is displayed on the display 83, is deteriorated when compared to that of the image on which the first decoding is performed, which is displayed on the display 52.

Figure 24:
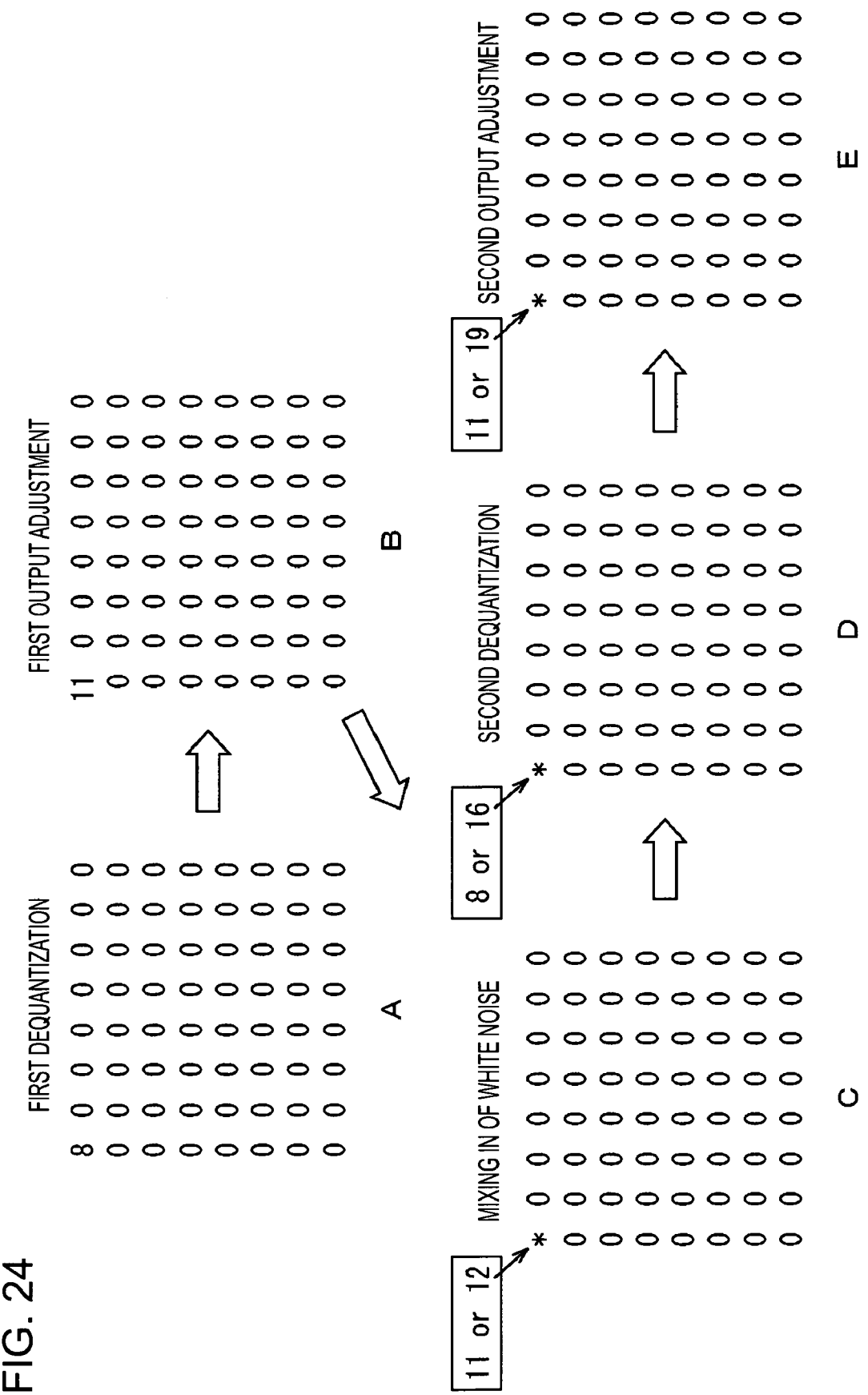
FIG. 24 illustrates the decoding process according to the third embodiment of the present invention.

As a result of subsequent further decoding (as a result of reproduction and decoding for the purpose of making copies), as shown in part E of FIG. 24, the DCT coefficient of the value 16 is adjusted so as to be output as a value 19.

On the basis of such principles, in the above-described image processing system 50, each time content (image) is copied (decoding and coding are repeated), the image quality (for example, the S/N ratio) is deteriorated. As a result, since it has no meaning to copy content, copying using an analog image signal is not performed (illegal copying can be prevented).

In the foregoing, in the image processing system 50, when analog distortion does not exist, since the threshold value is not extended over in any coding, even if coding and decoding are performed again, the output does not change at all from that in the first time, and the playback with the normal quality becomes possible.

In the above-described decoding sections 94 (FIGS. 7, 14, and 21), the output adjustment circuits 254, 263, and 274 for changing the quantized data to a value in the vicinity of the threshold value are provided, respectively. Alternatively, it is also possible for the dequantization circuits 253, 262, and 273 to dequantize the quantized data so that it becomes a value in the vicinity of the threshold value.

FIGS. 25, 28, and 31 show examples of the configuration of the decoding section 94 corresponding to the first embodiment (FIG. 7), the second embodiment (FIG. 14), and the third embodiment (FIG. 21) when a dequantization circuit performs a dequantization so that data becomes a value in the vicinity of the threshold value.

The decoding section 94 of FIG. 25 will now be described. Components of the decoding section 94 in FIG. 25, which correspond to those of the decoding section 94 in FIG. 7, are designated with the same reference numerals, and accordingly, descriptions thereof are omitted.

That is, in this decoding section 94, the output adjustment circuit 254 of the decoding section 94 of FIG. 7 is omitted, and instead of the dequantization circuit 253, a dequantization circuit 281 is provided.

The dequantization circuit 281 dequantizes the coded data (code for each pixel forming the block BL) Vcdo supplied from the data decomposition circuit 252 to a predetermined value on the basis of the dynamic Vcddr supplied from the data decomposition circuit 252, and outputs the predetermined value to the adder 255.

Figure 26:
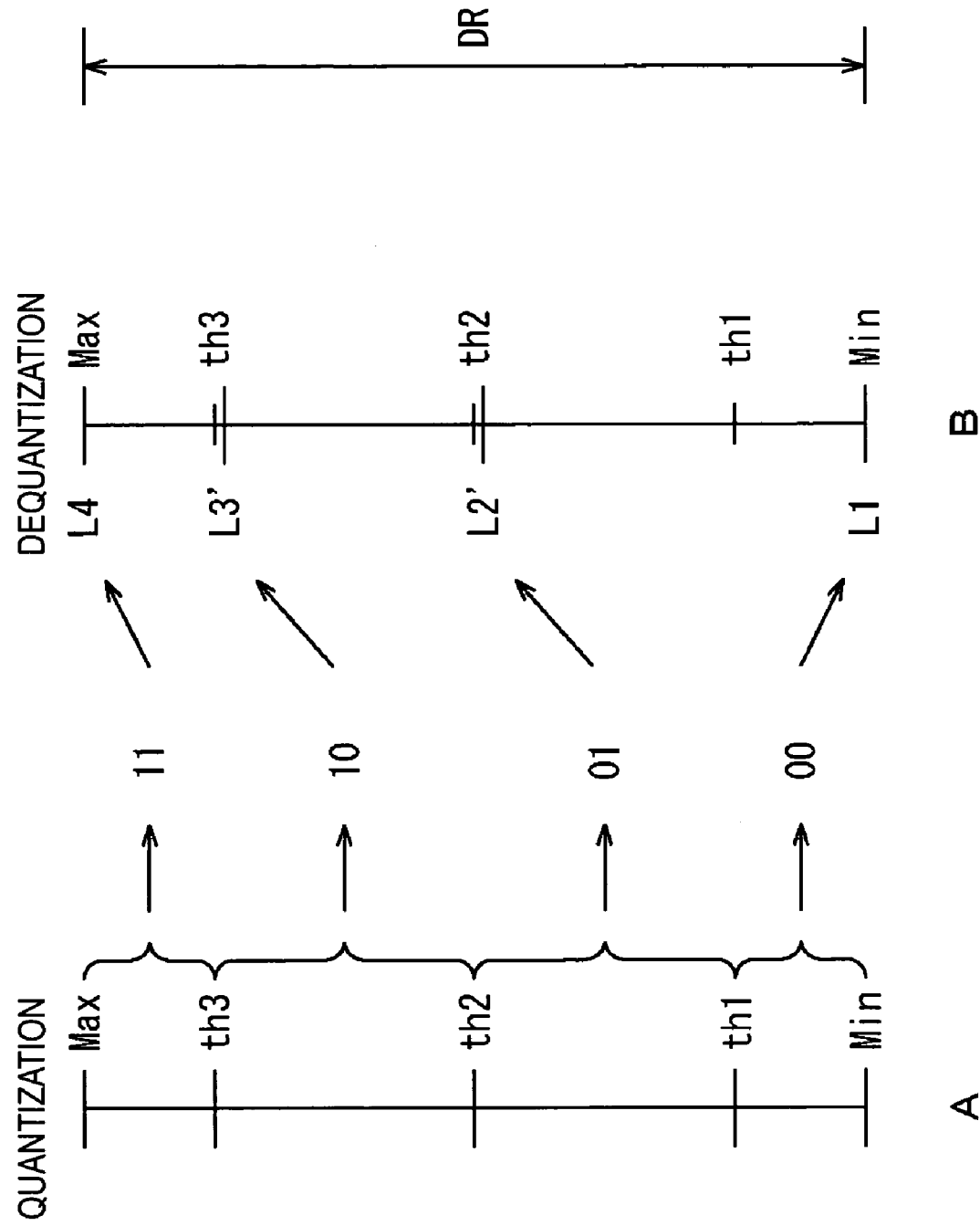
FIG. 26 illustrates a process of a dequantization circuit 281 of FIG. 25.

More specifically, as shown in parts A and B of FIG. 26, when the code signal as coded data Vcdo is 11, the dequantization circuit 281 dequantizes the code signal to a value L4 (value corresponding to the maximum value Vcdmax). When the code signal is 10, the dequantization circuit 281 dequantizes the code signal to a value L3' closer to the threshold value th3. When the code signal is 01, the dequantization circuit 281 dequantizes the code signal to a value L2' closer to the threshold value th2. When the code signal is 00, the dequantization circuit 281 dequantizes the code signal to a value L1 (value corresponding to the Vcdmin).

In the example of FIG. 26, the data is changed to a value closer to the threshold value in the higher region. In addition, the data can also be changed to a value closer to the threshold value in the lower region.

As a result of performing a dequantization in this manner, a dequantized value that is the same as the output from the output adjustment circuit 254 of FIG. 7 can be obtained.

Figure 27:
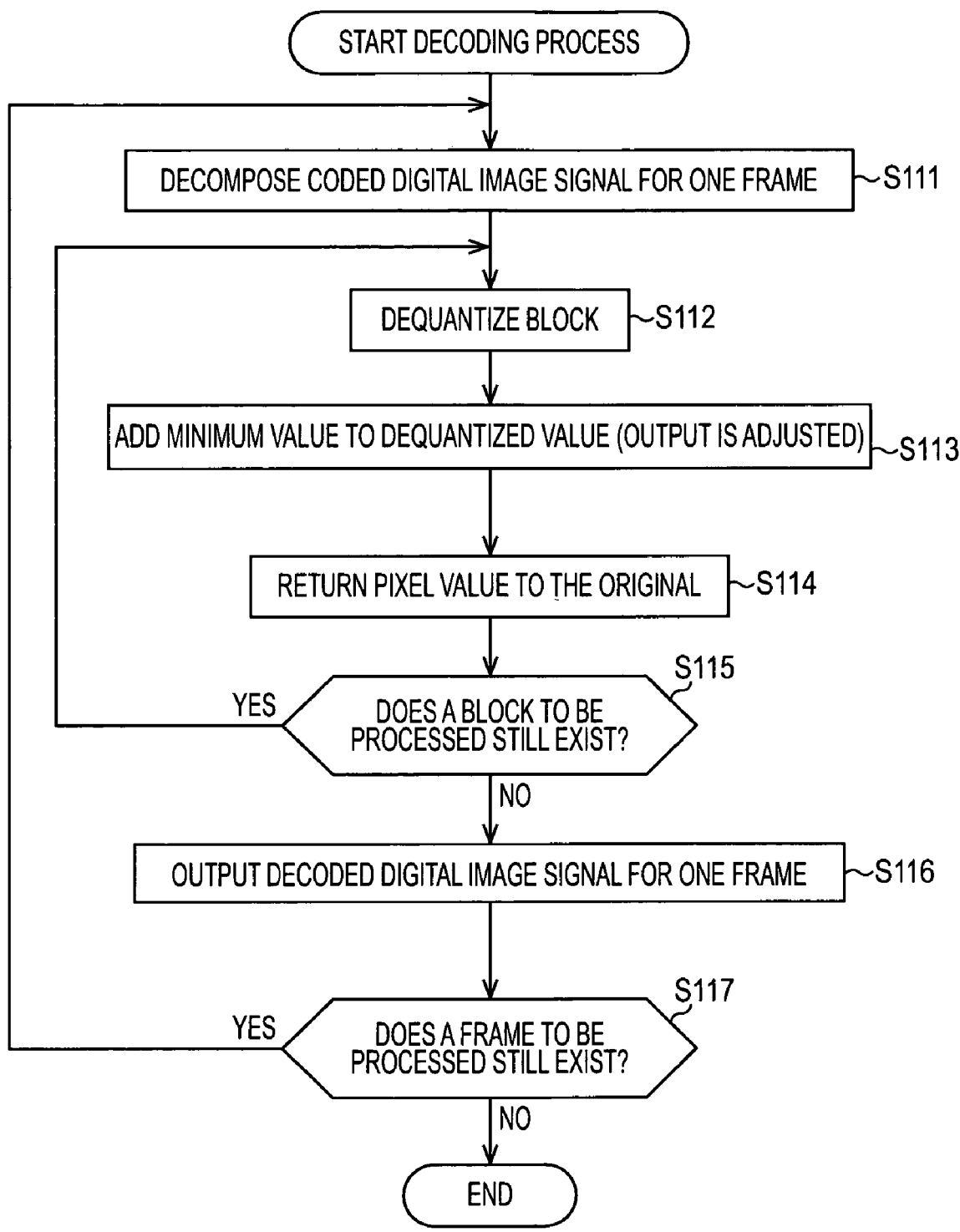
FIG. 27 is another flowchart illustrating the decoding process according to the first embodiment of the present invention.

The operation of the decoding section 94 of FIG. 25 will now be described below with reference to the flowchart in FIG. 27.

In the processing of the decoding section 94 of FIG. 7, in step S23 of FIG. 10, the output adjustment section 254 adjusts the dequantized value. However, in the decoding section 94 of FIG. 25, since the dequantized value itself is an adjusted value (value closer to the threshold value), in the flowchart of FIG. 27, the process corresponding to step S23 of FIG. 10 is omitted. The remaining processes are identical to the processes of each step of the flowchart in FIG. 10, and accordingly, descriptions thereof are omitted.

The decoding section 94 of FIG. 28 will now be described. Components of the decoding section 94 in FIG. 28, which correspond to those of the decoding section 94 in FIG. 14, are designated with the same reference numerals, and accordingly, descriptions thereof are omitted.

That is, in this decoding section 94, the output adjustment circuit 263 of FIG. 14 is omitted, and instead of the inverse vector quantization circuit 262, an inverse vector quantization circuit 291 is provided.

The inverse vector quantization circuit 291 performs inverse vector quantization on the coded digital image signal Vcd1 (code of the block BL) supplied via the input terminal 261, and supplies the signal to the block decomposition circuit 264.

More specifically, the inverse vector quantization circuit 291 selects, from a codebook, a value corresponding to the code supplied as the coded digital image Vcd1 (001 in the example of part A of FIG. 29). Since values closer to the threshold value th are registered in the codebook as shown in part B of FIG. 29, a value closer to the threshold value th is selected.

As a result of performing inverse vector quantization in this manner, a dequantized value that is the same as the output from the output adjustment circuit 263 of FIG. 14 can be obtained.

Figure 30:
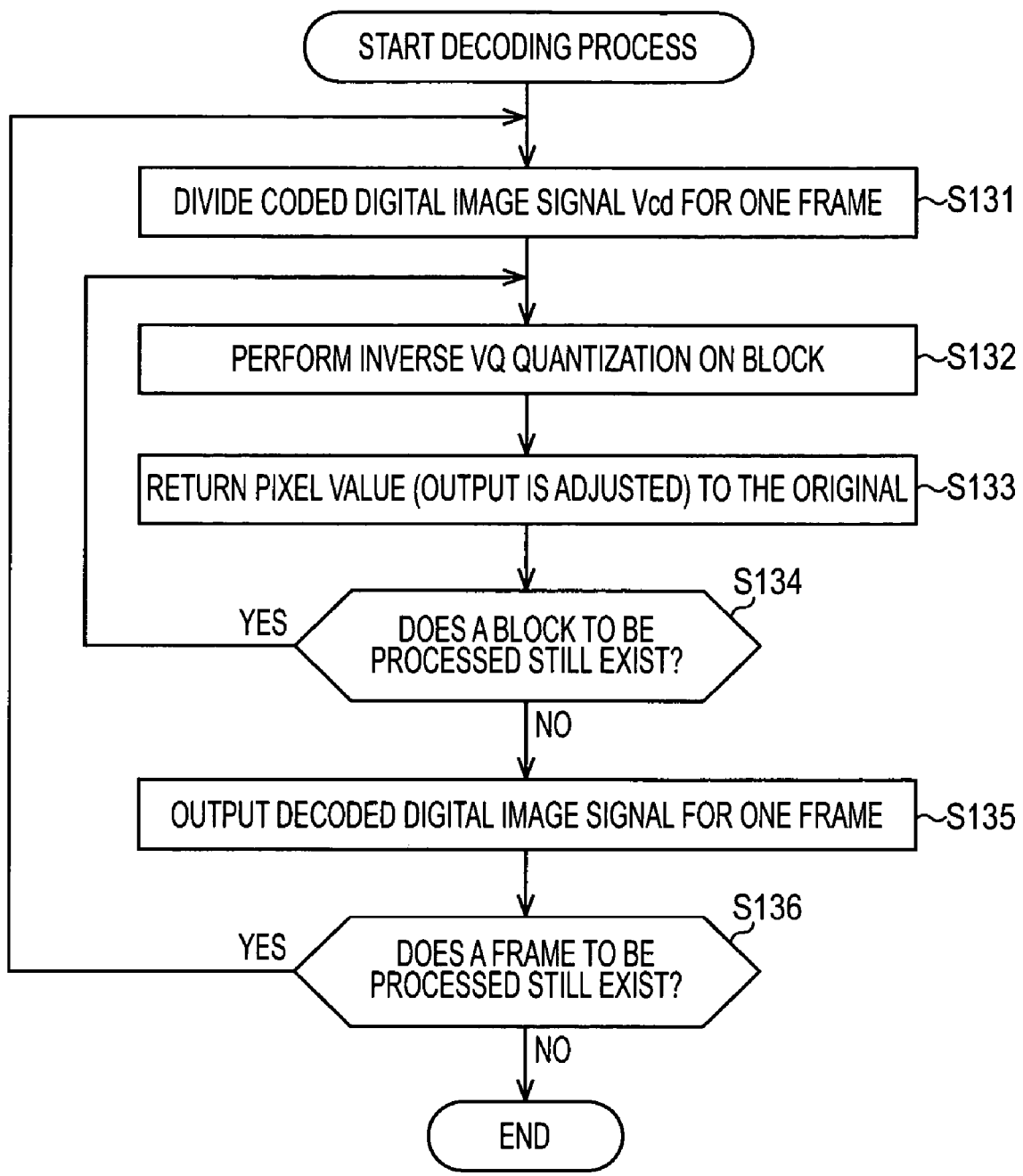
FIG. 30 is another flowchart illustrating the decoding process according to the second embodiment of the present invention.

The operation of the decoding section 94 of FIG. 28 will now be described with reference to the flowchart in FIG. 30.

Figure 16:
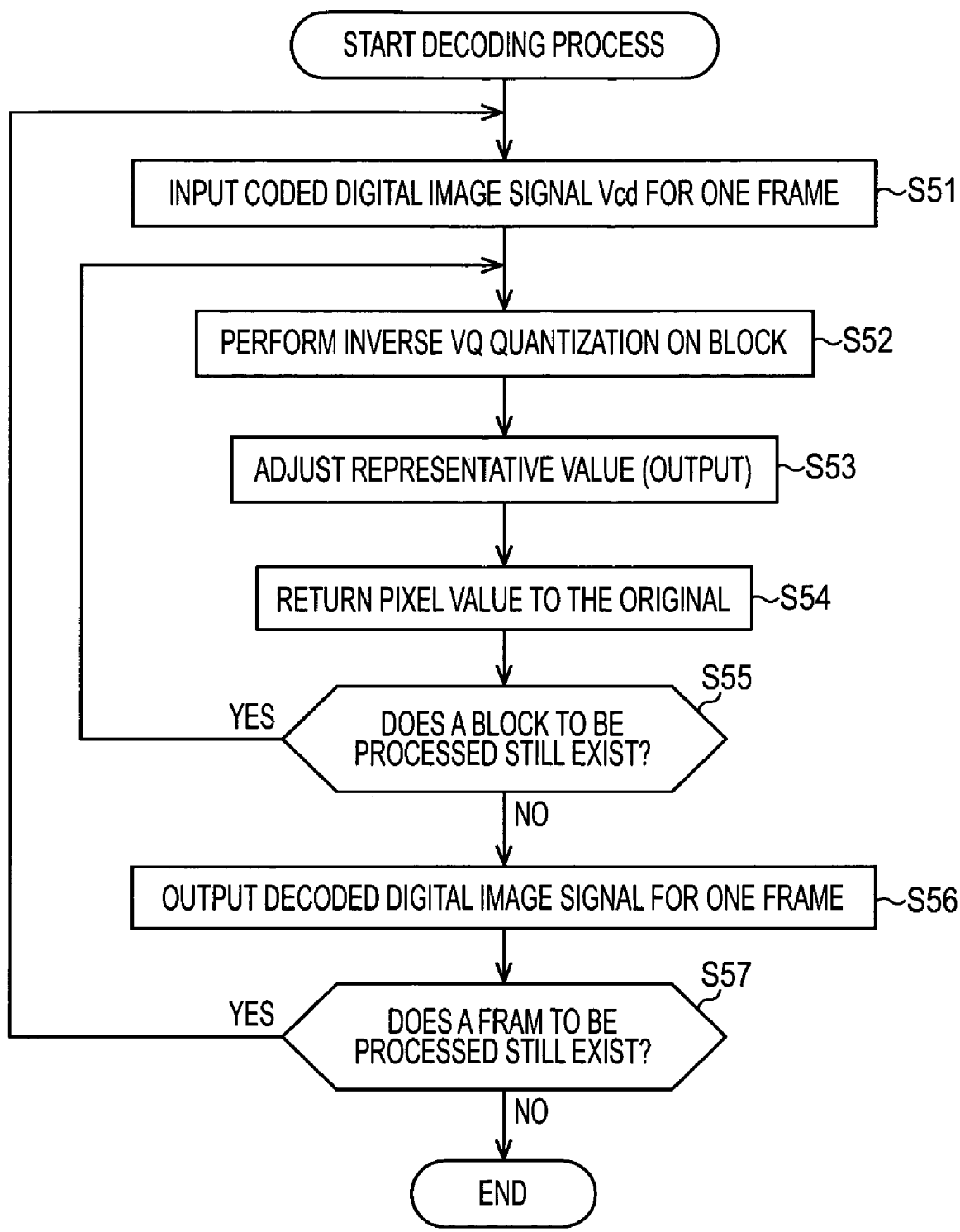
FIG. 16 is a flowchart illustrating a decoding process according to the second embodiment of the present invention.

In the processing of the decoding section 94 of FIG. 14, in step S53 of FIG. 16, the output adjustment section 263 adjusts the dequantized value. In the decoding section 94 of FIG. 28, since the dequantized value itself is an adjusted value (value closer to the threshold value), in the flowchart of FIG. 30, the process corresponding to step S53 of FIG. 16 is omitted. The remaining processes are identical to the processes of each step of the flowchart in FIG. 16, and accordingly, descriptions thereof are omitted.

The decoding section 94 of FIG. 31 will now be described. Components of the decoding section 94 in FIG. 31, which correspond to those of the decoding section 94 in FIG. 21, are designated with the same reference numerals, and accordingly, descriptions thereof are omitted.

That is, in this decoding section 94, the output adjustment circuit 274 of FIG. 21 is omitted, and instead of the dequantization circuit 273, a dequantization circuit 301 is provided.

The dequantization circuit 301 dequantizes the quantized DCT coefficient supplied from the entropy decoding circuit 272, and supplies the resultant DCT coefficient to the inverse DCT circuit 275.

Figure 32:
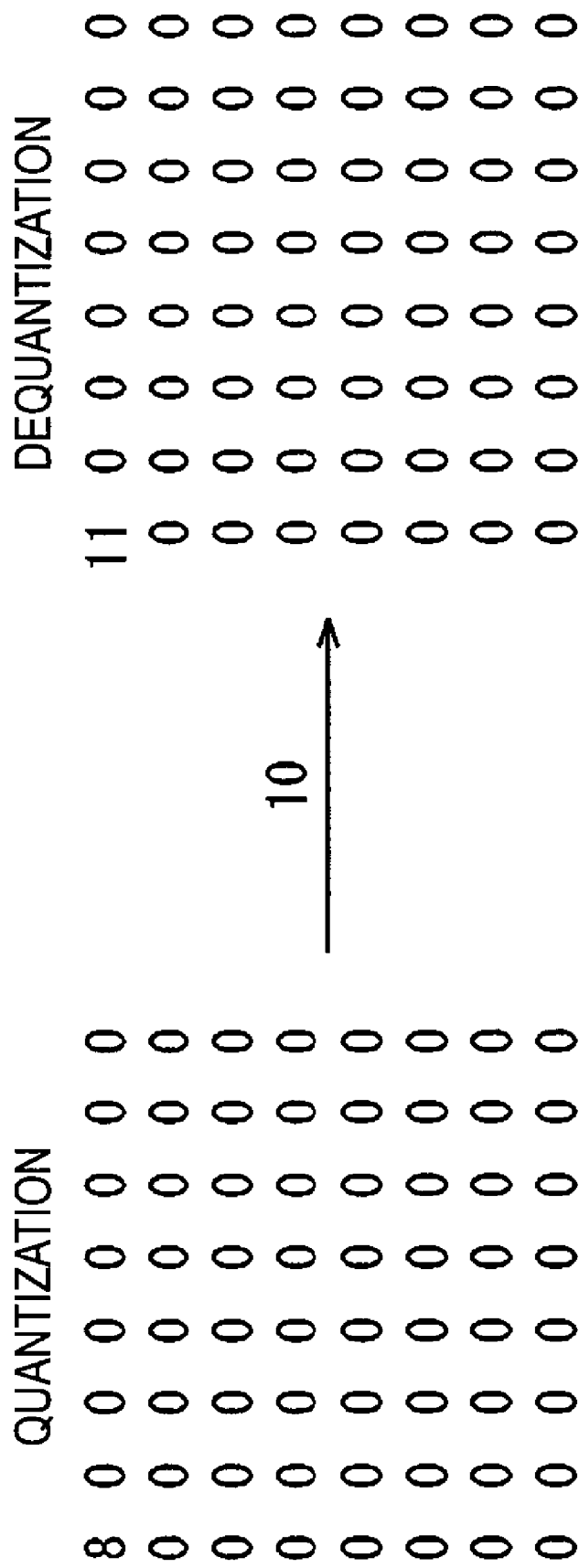
FIG. 32 illustrates a process of a dequantization circuit 301 of FIG. 31.

More specifically, as shown in part A of FIG. 32, the dequantization circuit 301 dequantizes the DCT coefficient that should be dequantized to the original value 8, to a value 11 closer to the threshold value 12.

As a result of performing a dequantization in this manner, the same dequantized value as the output of the output adjustment circuit 274 of FIG. 21 can be obtained.

Figure 33:
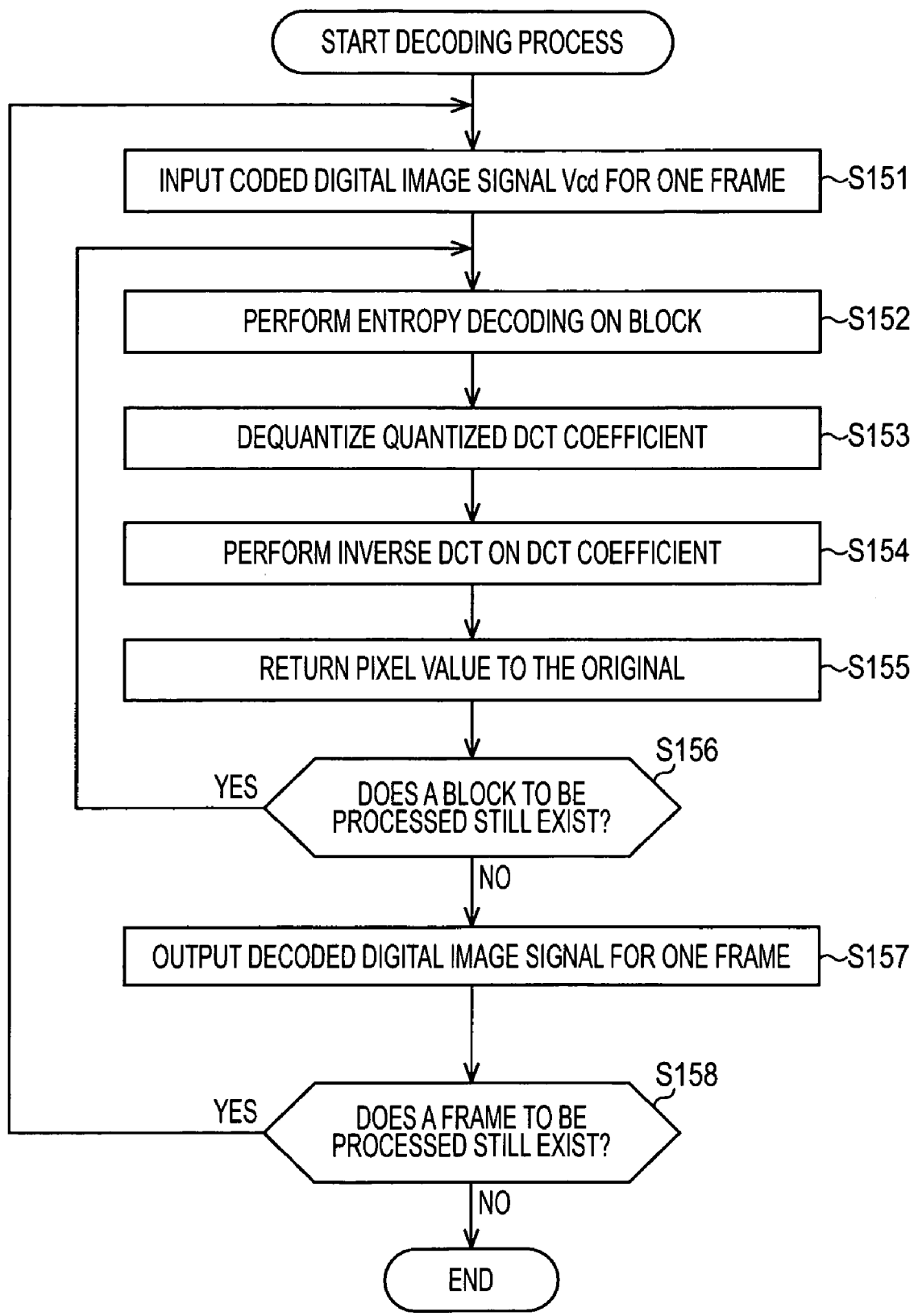
FIG. 33 is another flowchart illustrating the decoding process according to the third embodiment of the present invention.

The operation of the decoding section 94 of FIG. 31 will now be described with reference to the flowchart in FIG. 33.

Figure 23:
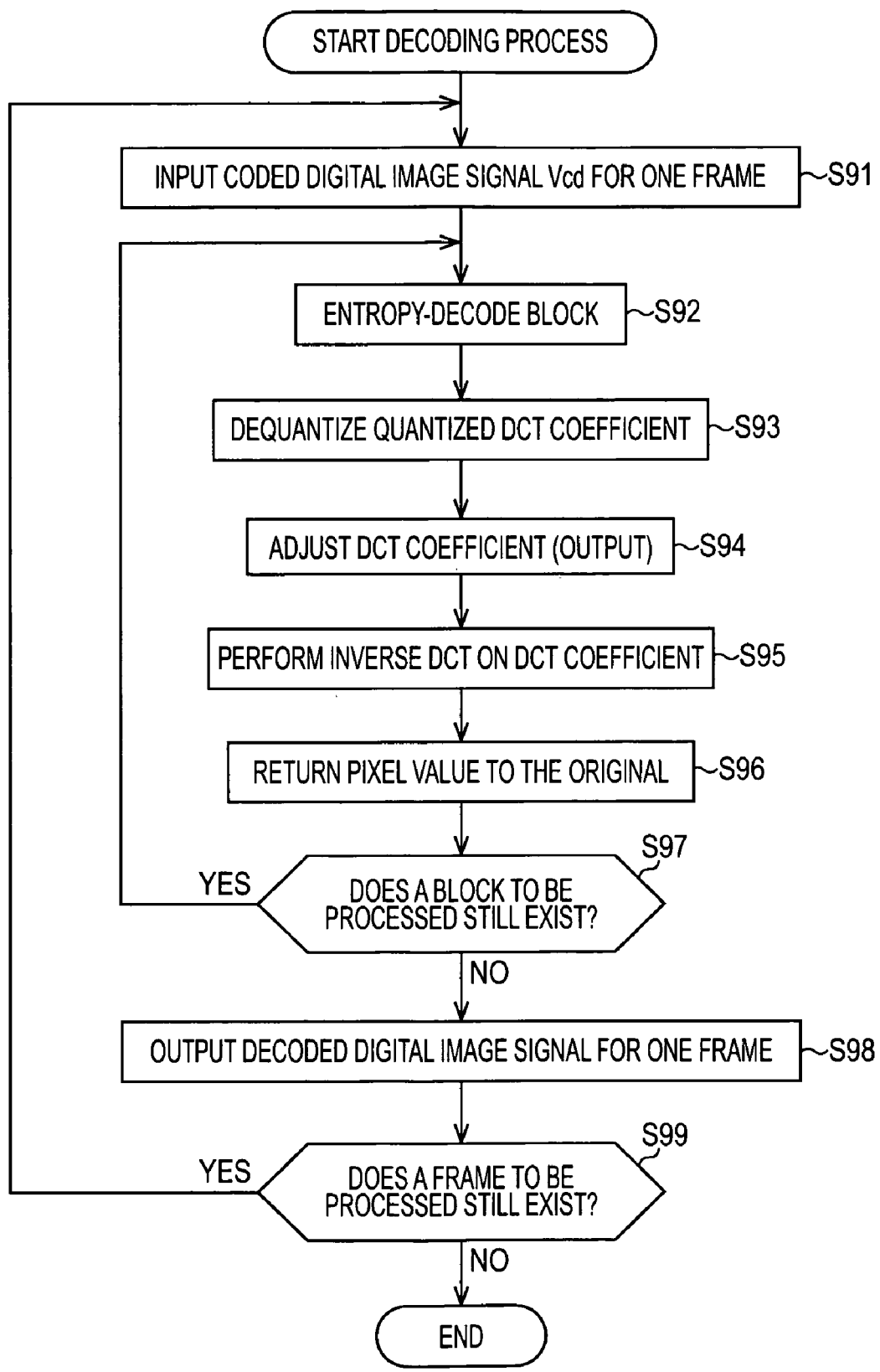
FIG. 23 is a flowchart illustrating a decoding process according to the third embodiment of the present invention.

In the processes of the decoding section 94 of FIG. 21, in step S94 of FIG. 23, the output adjustment section 274 adjusts the dequantized value. However, in the decoding section 94 of FIG. 31, since the dequantized value itself is an adjusted value (value closer to the threshold value), in the flowchart of FIG. 33, the process corresponding to step S94 of FIG. 23 is omitted. The remaining processes are identical to the processes of each step of the flowchart in FIG. 23, and accordingly, descriptions thereof are omitted.

Since the above-described image processing system 50 uses analog distortion that occurs naturally, when there is no analog distortion, a variation in the pixel value that extends over the threshold value does not occur in any decoding and coding, and therefore the image quality does not deteriorate.

Figure 34:
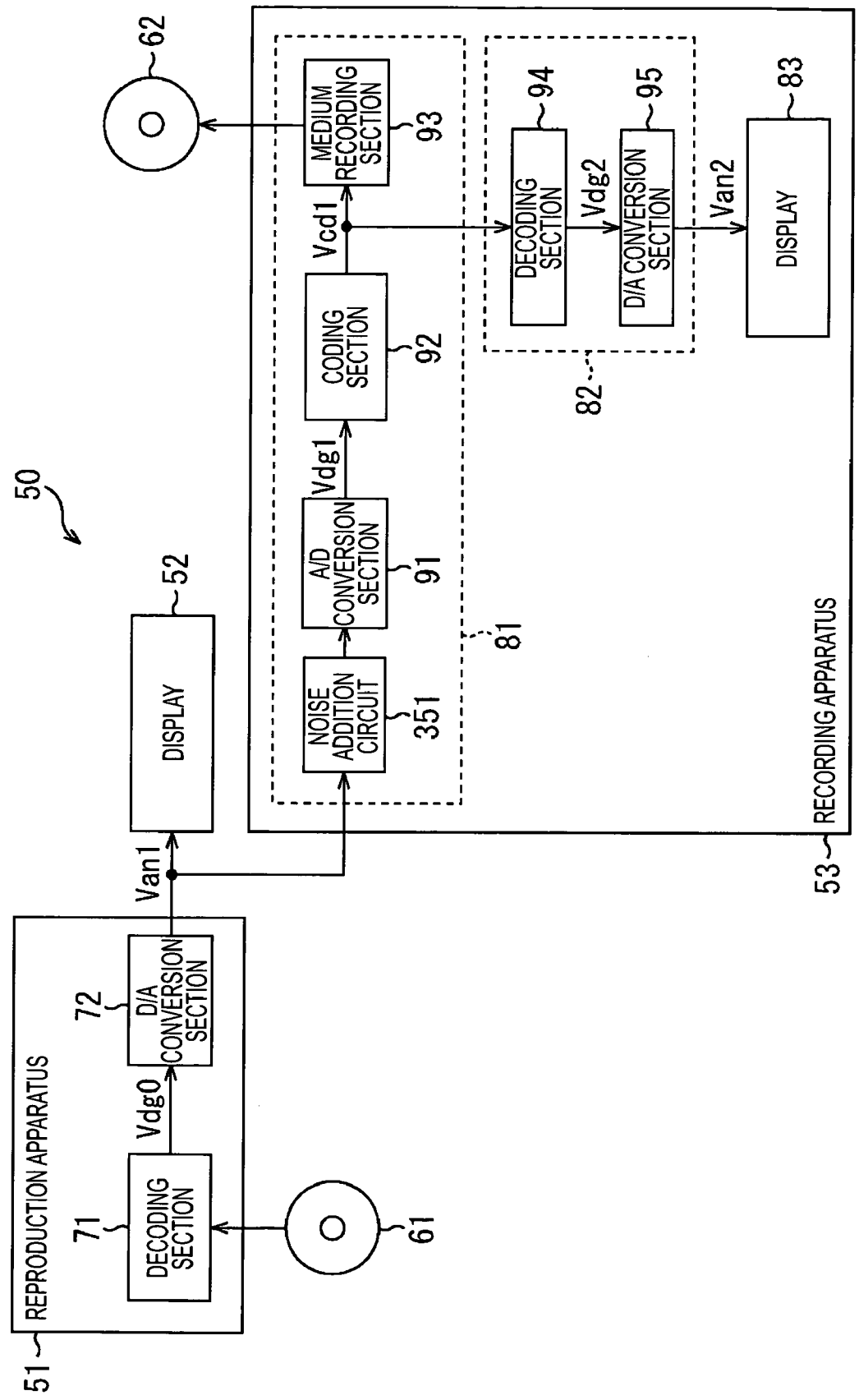
FIG. 34 is a block diagram showing another example of the configuration of the image processing system to which an embodiment of the present invention is applied.

Therefore, as shown in FIG. 34, it is also possible to add noise (analog noise) that intentionally causes analog distortion to occur, to the analog image signal Van1 output from the reproduction apparatus 51.

The image processing system 50 of FIG. 34 is configured similarly to the image processing system 50 of FIG. 2 except that a noise addition section 351 is newly provided in the recording section 81 of the recording apparatus 53.

The analog image signal Van1 output from the reproduction apparatus 51 is input to the noise addition section 351 of the recording apparatus 53. The noise addition section 351 adds noise to the input analog image signal Van1 and supplies the signal to the A/D conversion section 91.

As described above, the analog image signal Van1 in which, in addition to analog distortion that occurs naturally, analog distortion is caused to occur (having analog distortion) as a result of intentionally adding noise is coded. In this case, due to second and subsequent coding and decoding, the image quality is deteriorated considerably further.

The reproduction apparatus 51 may add noise to the analog image signal Van1 and thereafter output the signal.

Figure 35:
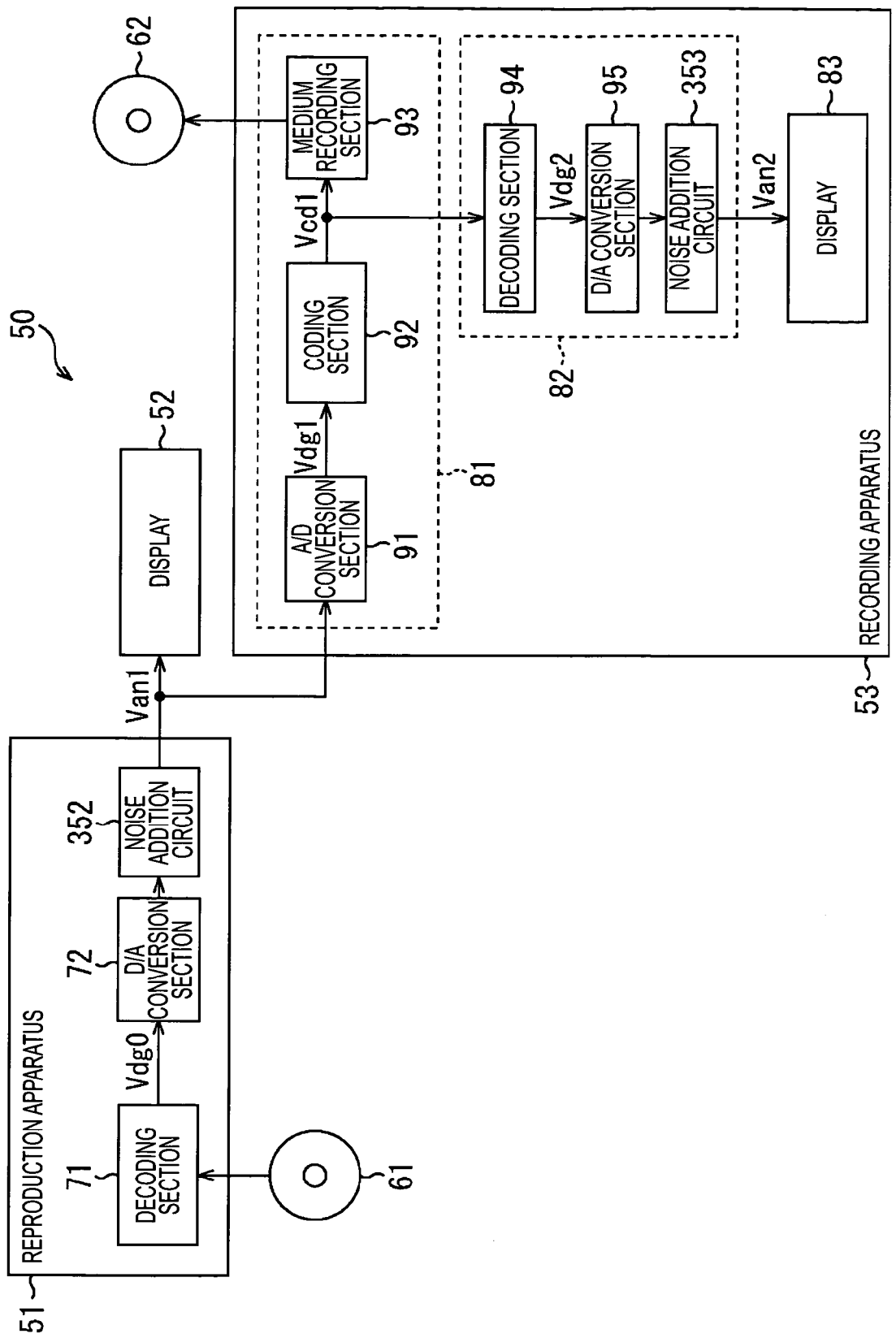
FIG. 35 is a block diagram showing another example of the configuration of the image processing system to which an embodiment of the present invention is applied.

FIG. 35 shows an example of the configuration of the image processing system 50 when the reproduction apparatus 51 outputs the analog image signal Van1 after adding noise thereto. The image processing system 50 of FIG. 35 is configured similarly to the image processing system 50 of FIG. 2 except that a noise addition section 352 is further provided in the reproduction apparatus 51 and a noise addition section 353 is provided also in the reproduction section 82 of the recording apparatus 53 that is configured similarly to the reproduction apparatus 51.

An analog image signal reproduced from the recording medium 61 is supplied from the D/A conversion section 72 to the noise addition section 352 of the reproduction apparatus 51. The noise addition section 352 adds noise to the analog image signal from the D/A conversion section 72 and outputs the resultant analog image signal Van1 to the display 52 and the recording apparatus 53.

Also, in the reproduction section 82 of the recording apparatus 53, similarly, the analog image signal is supplied from the D/A conversion section 95 to the noise addition section 353. The noise addition section 353 adds noise to the analog image signal from the D/A conversion section 95 and outputs the resultant analog image signal Van2 to the display 83.

The series of processes of the recording confirmation process, the coding process, and the decoding process described above can be performed by dedicated hardware and can also be performed by software. When the series of processes is to be performed by software, for example, the series of processes can be performed by allowing a (personal) computer shown in FIG. 36 to execute a program.

Figure 36:
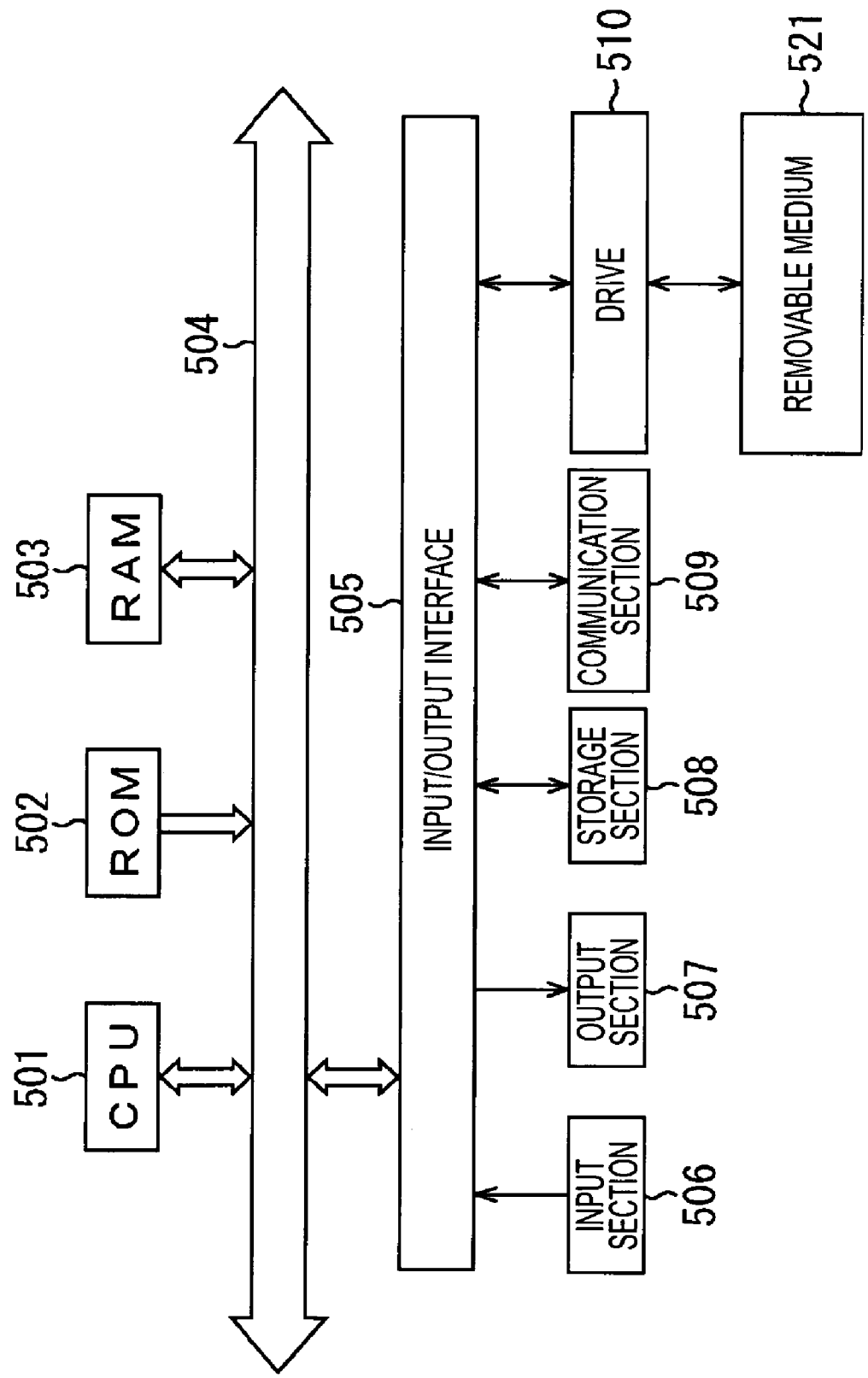
FIG. 36 is a block diagram showing an example of the configuration of a personal computer.

In FIG. 36, a CPU (Central Processing Unit) 501 performs various kinds of processes in accordance with programs stored in a ROM (Read Only Memory) 502 or in accordance with a program that is loaded from a storage section 508 to a RAM (Random Access Memory) 503. In the RAM 503, for example, data necessary for the CPU 501 to perform various kinds of processes is stored as appropriate.

The CPU 501, the ROM 502, and the RAM 503 are interconnected with one another via a bus 504. Furthermore, an input/output interface 505 is also connected to the bus 504.

An input section 506 including a keyboard, a mouse, an input terminal, etc., a display including a CRT (Cathode Ray Tube), an LCD (Liquid Crystal display), etc., an output section 507 including an output terminal, a speaker, etc., the storage section 508 including a hard disk, etc., and a communication section 509 including a terminal adapter, an A/DSL (Asymmetric Digital Subscriber Line) modem, a LAN (Local Area Network) card, etc., are connected to the input/output interface 505. The communication section 509 performs a communication process via various kinds of networks such as the Internet.

A drive 510 is also connected to the input/output interface 505. A removable medium (recording medium) 521, such as a magnetic disk (including a floppy disk), an optical disk (including a CD-ROM (Compact Disk-Read Only Memory) and a (DVD Digital Versatile Disk)), a magneto-optical disk (including an MD (Mini-Disk)), or a semiconductor memory, is connected to the drive 510 as appropriate. A computer program read from the removable medium is installed into the storage section 508 as necessary.

In this specification, the steps written in a flowchart include not only processing which is carried out chronologically in the written order but also processing which is executed concurrently or individually although it is not necessarily processed chronologically.

In this specification, the system designates the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A decoding apparatus comprising:
   an input section configured to input quantized data in which input image data is quantized; and
   a decoding section configured to:
      dequantize the quantized data to obtain a dequantized value, wherein the dequantized value is associated with a range, and
      convert the dequantized value into a value closer to a quantization threshold value which is a boundary of the range.

2. The decoding apparatus according to claim 1, wherein:
   the input section is configured to input the quantized data of a block, wherein the block is quantized on the basis of a dynamic range of image data, and
   the decoding section is configured to dequantize the quantized data and convert a resultant pixel value of the block into a value closer to a quantization threshold value within a range corresponding to the pixel value when the quantization is performed.

3. The decoding apparatus according to claim 1, wherein:
   the input section is configured to input quantized data obtained as a result of being vector quantized, and
   the decoding section is configured to:
      perform inverse vector quantization on the quantized data, and
      convert a resultant representative value into a value closer to a quantization threshold value within a range corresponding to the representative value when the quantization is performed.

4. The decoding apparatus according to claim 1, wherein:
   the input section is configured to input quantized data of DCT coefficients, and
   the decoding section is configured to:
      dequantize the quantized data, and
      convert a predetermined DCT coefficient of resultant DCT coefficients into a value closer to a quantization threshold value within a range corresponding to the DCT coefficient when the quantization is performed.

5. The decoding apparatus according to claim 1, further comprising a noise addition section configured to add noise to an output of the decoding section.

6. A decoding method comprising the steps of:
   inputting quantized data in which input image data is quantized;
   decoding by dequantizing the quantized data with at least one processor to obtain a dequantized value, wherein the dequantized value is within a range;
   converting the dequantized value into a value closer to a quantization threshold value which is a boundary of the range.

7. The decoding method according to claim 6, further comprising:
inputting the quantized data of a block, wherein the block is quantized on the basis of a dynamic range of image data,
dequantizing the quantized data, and
converting a resultant pixel value of the block into a value closer to a quantization threshold value within a range corresponding to the pixel value when the quantization is performed.

8. The decoding method according to claim 6, further comprising:
inputting quantized data obtained as a result of being vector quantized,
performing inverse vector quantization on the quantized data, and
converting a resultant representative value into a value closer to a quantization threshold value within a range corresponding to the representative value when the quantization is performed.

9. The decoding method according to claim 6, further comprising:
inputting quantized data of DCT coefficients,
dequantizing the quantized data, and
converting a predetermined DCT coefficient of resultant DCT coefficients into a value closer to a quantization threshold value within a range corresponding to the DCT coefficient when the quantization is performed.

10. The decoding method according to claim 6, further comprising:
adding noise to an output of the decoding.

11. A computer-readable medium comprising program instructions, which, when executed by a processor, cause the processor to perform a method for decoding quantized data, the method comprising:
inputting quantized data in which input image data is quantized;
dequantizing the quantized data to obtain a dequantized value, wherein the dequantized value is within a range; and
converting the dequantized value into a value closer to a quantization threshold value which is a boundary of the range.

12. An image processing system comprising:
a coding device configured to code input image data; and
a decoding device with at least one processor configured to decode the coded input image data,
wherein, if coding and decoding are repeated on the input image data, the image quality of an image corresponding to the input image data is deteriorated, and
the decoding device includes
an input section inputting quantized data in which the input image data is quantized, and
a decoding section configured to:
dequantize the quantized data to obtain a dequantized value, wherein the dequantized value is associated with a range, and
convert the dequantized value into a value closer to a quantization threshold value which is a boundary of the range.

13. The image processing system according to claim 12, wherein the decoding device further comprises a noise addition section adding noise to the output of the decoding section.

14. An image processing method for use with an image processing system including a coding device configured to code input image data, and a decoding device configured to decode the coded input image data, wherein, if coding and decoding are repeated on the input image data, the image quality of an image corresponding to the input image data is deteriorated, the image processing method comprising the steps of:
inputting quantized data in which input image data is quantized; and
decoding by dequantizing the quantized data with at least one processor to obtain a dequantized value, wherein the dequantized value is within a range;
convert the dequantized value into a value closer to a quantization threshold value which is a boundary of the range.

15. A decoding apparatus comprising:
input means for inputting quantized data in which input image data is quantized; and
decoding means:
for dequantizing the quantized data to obtain a dequantized value, wherein the dequantized value is associated with a range, and
for converting the dequantized value into a value closer to a quantization threshold value which is a boundary of the range.

16. An image processing system comprising:
a coding section coding input image data; and
a decoding section with at least one processor for decoding the coded input image data,
wherein, if coding and decoding are repeated on the input image data, the image quality of an image corresponding to the input image data is deteriorated, and
the decoding section includes
input means for inputting quantized data in which the input image data is quantized, and
decoding means:
for dequantizing the quantized data to obtain a dequantized value, wherein the dequantized value is associated with a range, and
for converting the dequantized value into a value closer to a quantization threshold value which is a boundary of the range.

* * * * *